(12) United States Patent
Nagayama et al.

(10) Patent No.: US 7,618,690 B2
(45) Date of Patent: *Nov. 17, 2009

(54) POLYMERIZABLE LIQUID CRYSTAL COMPOUND, LIQUID CRYSTAL COMPOSITION, OPTICAL ANISOTROPIC MATERIAL AND OPTICAL ELEMENT

(75) Inventors: Hiromichi Nagayama, Tokyo (JP); Yuriko Kaida, Tokyo (JP); Kara Yoshida, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/104,998

(22) Filed: Apr. 17, 2008

(65) Prior Publication Data

US 2008/0204650 A1 Aug. 28, 2008

Related U.S. Application Data

(63) Continuation of application No. PCT/JP2006/320417, filed on Oct. 12, 2006.

(30) Foreign Application Priority Data

Oct. 17, 2005 (JP) .............................. 2005-301138

(51) Int. Cl.
C09K 19/30 (2006.01)
C09K 19/38 (2006.01)
C09K 19/20 (2006.01)
G02B 5/30 (2006.01)
C07C 69/76 (2006.01)
C08F 20/18 (2006.01)
C08F 20/30 (2006.01)

(52) U.S. Cl. .................. 428/1.1; 428/1.31; 252/299.01; 252/299.63; 252/299.64; 252/299.65; 252/299.66; 252/299.67; 526/320; 349/117; 349/201; 560/59; 560/61; 560/62; 560/64; 560/65

(58) Field of Classification Search ............ 252/299.01, 252/299.63, 299.64, 299.65, 299.67, 299.66; 428/1.1, 1.31; 349/201, 117; 560/221, 59, 560/61, 62, 64, 65; 526/320
See application file for complete search history.

(56) References Cited

U.S. PATENT DOCUMENTS

| | | | |
|---|---|---|---|
| 6,183,822 B1 | 2/2001 | Farrand et al. | |
| 7,081,281 B2 | 7/2006 | Kumai et al. | |
| 7,371,438 B2 | 5/2008 | Kaida et al. | |
| 7,442,418 B2 * | 10/2008 | Kaida et al. | ................. 428/1.1 |
| 2007/0104894 A1 * | 5/2007 | Kaida et al. | ................. 428/1.1 |

FOREIGN PATENT DOCUMENTS

| | | |
|---|---|---|
| JP | 10-195138 | 7/1998 |
| JP | 2004-189715 | 7/2004 |
| JP | 2004-231638 | 8/2004 |
| JP | 2005-15473 | 1/2005 |
| JP | 2005-23019 | 1/2005 |
| WO | WO 2006/001096 A1 | 1/2006 |

* cited by examiner

*Primary Examiner*—Shean C Wu
(74) *Attorney, Agent, or Firm*—Oblon, Spivak, McClelland, Maier & Neustadt, L.L.P.

(57) ABSTRACT

A liquid crystal compound represented by the formula $CH_2=CR^1-COO-(L)_k-E^1-E^2-E^3-E^4-R^2$ wherein $R^1$: a hydrogen atom or a methyl group; $R^2$: a $C_{1-8}$ alkyl group; k: 0 or 1; L: $-(CH_2)_pO-$ or $-(CH_2)_q-$ (wherein each of p and q which are independent of each other, is an integer of from 2 to 8); $E^1$: a 1,4-phenylene group; $E^2$, $E^3$, $E^4$: each independently a 1,4-phenylene group or a trans-1,4-cyclohexylene group and at least one of $E^2$ and $E^3$ is a trans-1,4-cyclohexylene group, provided that the 1,4-phenylene group and trans-1,4-cyclohexylene group in $E^1$ to $E^{4,}$ may be such that a hydrogen atom bonded to a carbon atom in each group may be substituted by a fluorine atom, a chlorine atom or a methyl group. To provide a novel liquid crystal compound for preparing an optical element which can exhibit a proper Rd value depending upon usable wavelength and application and which is excellent in durability against a blue laser beam.

17 Claims, No Drawings

POLYMERIZABLE LIQUID CRYSTAL COMPOUND, LIQUID CRYSTAL COMPOSITION, OPTICAL ANISOTROPIC MATERIAL AND OPTICAL ELEMENT

TECHNICAL FIELD

The present invention relates to a novel compound, a liquid crystal composition containing the compound, an optical anisotropic material obtained by polymerizing the liquid crystal composition, and an optical element.

BACKGROUND ART

At the time of reading information recorded on an optical disk or writing information on an optical disk, an optical element to modulate (e.g. polarize, diffract or phase-shift) a laser beam is required.

For example, at the time of reading information, linearly-polarized light emitted from a laser light source is transmitted through a deflecting element and then through a phase plate and arrives at the surface of an optical disk. The polarization direction of the outward linearly-polarized light is aligned in a direction not changed by the deflecting element, and the outward linearly-polarized light is linearly transmitted through the deflecting element and transformed by the phase plate into a circularly-polarized light. This circularly-polarized light is reflected on the recording surface and becomes a reversed circularly-polarized light, which is again transformed by the phase plate into a linearly-polarized light perpendicular to incidence. Such a returning light beam will have its traveling direction bent when it is again passed through the deflecting element, and arrives at a light receiving element.

Further, during reading or writing of information, if the optical disk undergoes plane wobbling or the like, the focus position of the beam spot will be displaced from the recording surface, and a servo mechanism will be required to detect and correct the displacement to let the beam spot follow a concavo-convex pit on the recording surface. Such a servo system for an optical disk is constructed so that the focus of a beam spot irradiated from a laser light source is adjusted on the recording surface and then the track position is detected to let the beam spot follow the desired track. Further, it is also necessary to make sure that the laser beam reflected without hitting the pit on the recording surface will not return as it is to the light source.

For this purpose, in an optical head device, an optical element to modulate (e.g. polarize, diffract or phase-shift) a laser beam is required. For example, a phase plate (wavelength plate) has effects to give a different refractive index to incident light depending upon the angle between the optical axis of the phase plate and the phase plane of the incident light and to shift the phases of two component lights formed by birefringence. The phase-shifted two lights will be joined when emitted from the phase plate. Such shifting of the phase is determined by the thickness of the phase plate. Accordingly, by adjusting the thickness, it is possible to prepare e.g. a quarter-wavelength plate having the phase shifted by $\pi/2$ or a half-wavelength plate having the phase shifted by $\pi$. For example, a linearly-polarized light passed through the quarter-wavelength plate will be a circularly-polarized light, and a linearly-polarized light passed through the half-wavelength plate will be a linearly-polarized light with its polarized light plane inclined at 90°. Optical elements are combined by utilizing such characteristics and applied to a servo mechanism, etc. Such optical elements are not limited to optical pickup elements used for reading records on optical disks, but they are utilized also for imaging elements in application to projectors, etc. or communication devices in application to wavelength-tunable filters, etc.

Further, these optical elements may also be prepared from liquid crystal materials. Liquid crystal molecules having polymerizable functional groups have both characteristics as a polymerizable monomer and characteristics as a liquid crystal. Accordingly, if the polymerization is carried out after liquid crystal molecules having polymerizable functional groups are aligned, it is possible to obtain an optical anisotropic material having alignment of the liquid crystal molecules fixed. The optical anisotropic material has an optical anisotropy such as a refractive index anisotropy derived from a mesogen skeleton and is applied to e.g. a diffraction element or a phase plate by the use of such a characteristic.

As such an optical anisotropic material, a polymer liquid crystal has, for example, been reported which is obtained by polymerizing a liquid crystal composition containing a compound represented by the following formula (2):

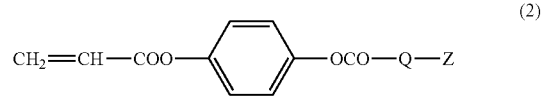

(2)

(wherein Q is a 1,4-phenylene group or a trans-1,4-cyclohexylene group, and Z is an alkyl group) (Patent Document 1).

Usually, the following properties are required for optical elements.

1) They have a proper retardation value (Rd value) depending upon usable wavelength and application.
2) The in-plane optical properties (such as the Rd value and the transmittance) are uniform.
3) There is no substantial scattering or absorption at usable wavelength.
4) The optical properties can easily be adjusted to those of other materials constituting the elements.
5) The wavelength dispersion of the refractive index or the refractive index anisotropy is small at usable wavelength.

It is particularly important to have a proper Rd value as mentioned in 1). The Rd value is defined by Rd=$\Delta n$ (value of refractive index anisotropy)×d (thickness in the light propagation direction). Accordingly, it becomes particularly important that the material to constitute an optical element has a proper $\Delta n$ value. For example, if $\Delta n$ is small, the thickness d is required to be increased. However, if the thickness d is increased, alignment of liquid crystal molecules tends to be difficult, and it tends to be difficult to obtain the desired optical properties. On the other hand, if the $\Delta n$ value is large, the thickness d is required to be small, but in such a case, it becomes difficult to precisely control the thickness.

Further, in recent years, in order to increase the capacity of optical disks, it has been attempted to shorten the wavelength of a laser beam to be used for writing or reading of information and to further reduce the concavo-convex pit size on optical disks. At present, a laser beam having a wavelength of 780 nm is used for CD, and a laser beam having a wavelength of 660 nm is used for DVD. For optical recording media of next generation, use of a laser beam having a wavelength of from 300 to 450 nm (hereinafter referred to also as a blue laser beam) is being studied. However, conventional materials such as polymer liquid crystals disclosed in JP-A-10-195138 have had a problem that the durability against such a blue laser beam is inadequate.

For example, if an optical element (such as a phase plate) made of an organic substance such as liquid crystal is disposed in an optical system and is used as an optical head device, aberration may sometimes occur as the time passes. This is considered attributable to a damage to the organic substance caused by exposure to the laser beam. Once aberration occurs, when light (a light beam) emitted from a laser light source and passed through e.g. a collimator lens or an optical element, is further passed through an object lens and reaches the surface of the recording medium, the light beam tends to hardly focus to form a beam spot, whereby the efficiency (the light utilization efficiency) for reading or writing of information is likely to be low.

Further, a material having a high refractive index anisotropy is usually required in order to reduce the size and improve the efficiency of an element. Generally, a material having a high refractive index anisotropy tends to have a high refractive index. Further, a high refractive index material has a characteristic such that the wavelength dispersion of the refractive index is large, and thus, the absorption of light with respect to light having a short wavelength tends to be high (i.e. the molar absorbance coefficient of the material tends to be large). Therefore, conventional high refractive index materials have had a problem that they tend to absorb light having a short wavelength such as a blue laser beam, and the light resistance is low.

Accordingly, an optical element such as a diffraction element or a phase plate is required to modulate a laser beam having a wavelength of from 300 to 450 nm, and an optical anisotropic material is desired which is excellent in durability without deterioration even when exposed to a laser beam in such a wavelength zone.

Patent Document 1: JP-A-10-195138

DISCLOSURE OF THE INVENTION

Problems to be Solved by the Invention

The present invention has been made to solve the above-mentioned problems and has an object to provide an optical anisotropic material and optical element which satisfy the properties required for an optical anisotropic material and optical element and which provide a proper Rd value depending upon usable wavelength and application and have high durability particularly against a blue laser beam, and a novel liquid crystal composition and compound useful to prepare them.

Means to Solve the Problems

In order to solve the above-mentioned problems, the present inventors have conducted an extensive study and have arrived at the present invention. The present invention provides the following:

(1) A compound represented by the following formula (1):

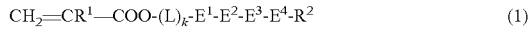

provided that the symbols in the formula have the following meanings:

$R^1$: a hydrogen atom or a methyl group;
$R^2$: a $C_{1-8}$ alkyl group or a fluorine atom;
k: 0 or 1;
L: $-(CH_2)_pO-$ or $-(CH_2)_q-$ (wherein each of p and q which are independent of each other, is an integer of from 2 to 8);
$E^1$: a 1,4-phenylene group;
$E^2$, $E^3$, $E^4$: each independently a 1,4-phenylene group or a trans-1,4-cyclohexylene group and at least one of $E^2$ and $E^3$ is a trans-1,4-cyclohexylene group, provided that the 1,4-phenylene group and trans-1,4-cyclohexylene group in $E^1$ to $E^4$, may be such that a hydrogen atom bonded to a carbon atom in each group may be substituted by a fluorine atom, a chlorine atom or a methyl group.

(2) The compound according to the above (1), wherein when a 1,4-phenylene group is represented by -Ph- and a trans-1,4-cyclohexylene group is represented by -Cy-, -$E^1$-$E^2$-$E^3$-$E^4$- is -Ph-Cy-Ph-Ph-, -Ph-Ph-Cy-Cy- or -Ph-Ph-Cy-Ph-.

(3) The compound according to the above (1) or (2), wherein k is 1.

(4) A liquid crystal composition containing at least 75 mass % of a polymerizable liquid crystal containing the compound as defined in the above (1), (2) or (3).

(5) The liquid crystal composition according to the above (4), wherein the polymerizable liquid crystal comprises from 30 to 95 mass % of at least one compound as defined in the above (1), (2) or (3), and from 5 to 70 mass % of at least one compound selected from the compounds of the following formulae (3-1) and (3-2):

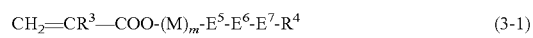

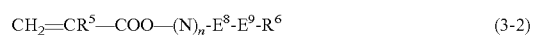

provided that the symbols in the formulae have the following meanings:

$R^3$, $R^5$: each independently a hydrogen atom or a methyl group;
$R^4$, $R^6$: each independently a $C_{1-8}$ alkyl group;
m, n: each independently 0 or 1;
M, N: each independently $-(CH_2)_sO-$ or $-(CH_2)_t-$ (provided that each of s and t which are independent of each other is an integer of from 2 to 8);
$E^5$, $E^6$, $E^7$, $E^8$, $E^9$: each independently a 1,4-phenylene group or a trans-1,4-cyclohexylene group, provided that at least one of $E^5$, $E^6$ and $E^7$ is a trans-1,4-cyclohexylene group, provided that the above 1,4-phenylene group and trans-1,4-cyclohexylene group may be such that a hydrogen atom bonded to a carbon atom in each group may be substituted by a fluorine atom, a chlorine atom or a methyl group.

(6) An optical anisotropic material made of a polymer obtained by polymerizing the liquid crystal composition as defined in the above (4) or (5) in a state where the liquid crystal composition shows a liquid crystal phase and in a state where the liquid crystal is aligned.

(7) The optical anisotropic material according to the above (6), which is an optical anisotropic material to be used for laser light having a wavelength of from 300 to 450 nm therethrough.

(8) An optical element having a structure such that the optical anisotropic material as defined in above (6) or (7) is sandwiched between a pair of supports.

(9) A diffraction element, which employs the optical element as defined in the above (8).

(10) A phase plate, which employs the optical element as defined in above (8).

EFFECTS OF THE INVENTION

According to the present invention, it is possible to obtain a novel compound, a liquid crystal composition containing such a compound, an optical anisotropic material obtained by polymerizing such a liquid crystal composition, and an optical element. When the novel compound and the liquid crystal composition of the present invention are used, it is possible to obtain a proper Rd value depending upon usable wavelength and application. The optical anisotropic material and optical element of the present invention can effectively be utilized for pickup elements, imaging elements, communication devices, etc., and they are excellent in the durability against a blue laser beam.

BEST MODE FOR CARRYING OUT THE INVENTION

In this specification, a compound represented by the formula (1) will be referred to also as a compound (1). The same applies to other compounds. In this specification, the 1,4-phenylene group and the trans-1,4-cyclohexylene group may be non-substituted groups, or a hydrogen atom bonded to a carbon atom in such a group may be substituted by a fluorine atom, a chlorine atom or a methyl group. Such a cyclic group has bonds at the 1- and 4-positions, and in this specification, the left hand side of such a cyclic group is regarded as the 1-position, and the right hand side of the cyclic group is regarded as the 4-position. Further, when the cyclic group is 1,4-cyclohexylene group, the bonds at the 1- and 4-positions are in the transform. Further, in a case where the alkyl group has a structural isomeric group, all such groups are included, and a linear alkyl group is preferred. In the following, "Ph" represents a 1,4-phenylene group which may have the above-mentioned substituent, and "Cy" represents a trans-1,4-cyclohexylene group which may have the above substituent.

Further, a compound having both liquid crystallinity and polymerizability will be hereinafter referred to as a polymerizable liquid crystal. The following description regarding the wavelength is meant to cover the range of the center wavelength ±2 nm. Further, the refractive index anisotropy will be abbreviated as Δn.

The compound of the present invention is a compound represented by the following formula (1). This compound (I) is one type of a polymerizable liquid crystal having both polymerizability and liquid crystallinity.

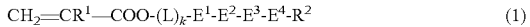 (1)

$R^1$ is a hydrogen atom or a methyl group and is preferably a hydrogen atom. If $R^1$ is a hydrogen atom, the polymerization readily proceeds when the after-mentioned liquid crystal composition containing the compound (1), is subjected to photopolymerization to obtain an optical anisotropic material and an optical element, such being preferred. Further, the properties as an optical anisotropic material and an optical element obtained by the photopolymerization are less susceptible to an influence of the external environment (such as the temperature), and therefore, there is also an advantage such that the in-plane distribution of the retardation is small.

$R^2$ is a $C_{1-8}$ alkyl group or a fluorine atom, whereby the melting point ($T_m$) (i.e. the crystal phase-nematic phase transition point) of the liquid crystal composition containing the compound (1) can be lowered. $R^2$ is preferably a $C_{2-6}$ alkyl group or a fluorine atom. Further, when $R^2$ is an alkyl group, it preferably has a linear structure, whereby the temperature range within which the compound (1) shows liquid crystallinity will be broad.

k is 0 or 1, and in the present invention, it is preferably 1. L is —$(CH_2)_pO$— or —$(CH_2)_q$—, preferably —$(CH_2)_p$O—.

In general, when a polymerizable liquid crystal is polymerized, the value of Δn tends to decrease after the polymerization, but in a case where L is a group having a polymethylene group such as —$(CH_2)_pO$— or —$(CH_2)_q$—, the decrease in the Δn value after the polymerization can be suppressed.

$E^1$ is a 1,4-phenylene group, and each of $E^2$, $E^3$ and $E^4$ which are independent of one another, is a 1,4-phenylene group or a trans-1,4-cyclohexylene group. The number of cyclic groups which the compound (1) has is 4, and at least one of $E^2$ and $E^3$ is Cy. Further, at least one of $E^1$, $E^3$ and $E^4$ is preferably Ph. Further, in a case where the compound contains a plurality of Ph, two Ph are preferably adjacent to each other, whereby the Δn value can be made large, but if three or more Ph are directly connected, the durability against blue laser is likely to deteriorate. When at lease one of $E^2$ and $E^3$ in the compound (1) is Cy, there will be no possibility of such direct connection of three or more Ph.

The structure of "$E^1$-$E^2$-$E^3$-$E^4$" may be "Ph-Ph-Cy-Ph", "Ph-Cy-Ph-Ph", "Ph-Ph-Cy-Cy", "Ph-Cy-Cy-Ph", "Ph-Cy-Ph-Cy" or "Ph-Cy-Cy-Cy". Among them, "Ph-Cy-Ph-Ph", "Ph-Ph-Cy-Cy" or "Ph-Ph-Cy-Ph" is preferred in that Δn of the compound (1) can thereby be made large. It is thereby possible to easily prepare a liquid crystal composition showing a large Δn.

As the compound (1), the following compounds (1A) to (1C) are preferred.

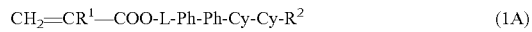 (1A)

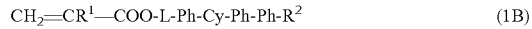 (1B)

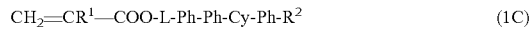 (1C)

Among them, preferred is a compound wherein $R^1$ is a hydrogen atom, and $R^2$ is a $C_{2-6}$ linear alkyl group or a fluorine atom, and particularly preferred is a compound wherein -L- is —$(CH_2)_pO$— (wherein p is particularly preferably an integer of from 4 to 6).

Further, in $E^1$ to $E^4$, the 1,4-phenylene group or the trans-1,4-cyclohexylene group may be such that a hydrogen atom bonded to a carbon atom in such a group may be substituted by a fluorine atom, a chlorine atom or a methyl group. In the present invention, the 1,4-phenylene group is preferably a non-substituted group, a group substituted by one fluorine atom, or a group substituted by one methyl group. When the 1,4-phenylene group has such a substituent, there is an effect to lower the melting point of the compound (1) and an effect to lower the viscosity. Further, the position of such a substituent is preferably at the 2- or 3-position. Further, the trans-1,4-cyclohexylane group is preferably a non-substituted group.

As the compound (1), the following compounds are preferred, and compounds (1A-1), (1A-3), (1A-5), (1B-1), (1B-3) to (1B-5), (1C-1) and (1C-2) are particularly preferred. Here, p in the formulae is as defined above and is preferably an integer of from 4 to 6. $R^{21}$ is a $C_{1-8}$ alkyl group and is preferably a $C_{2-6}$ linear alkyl group.

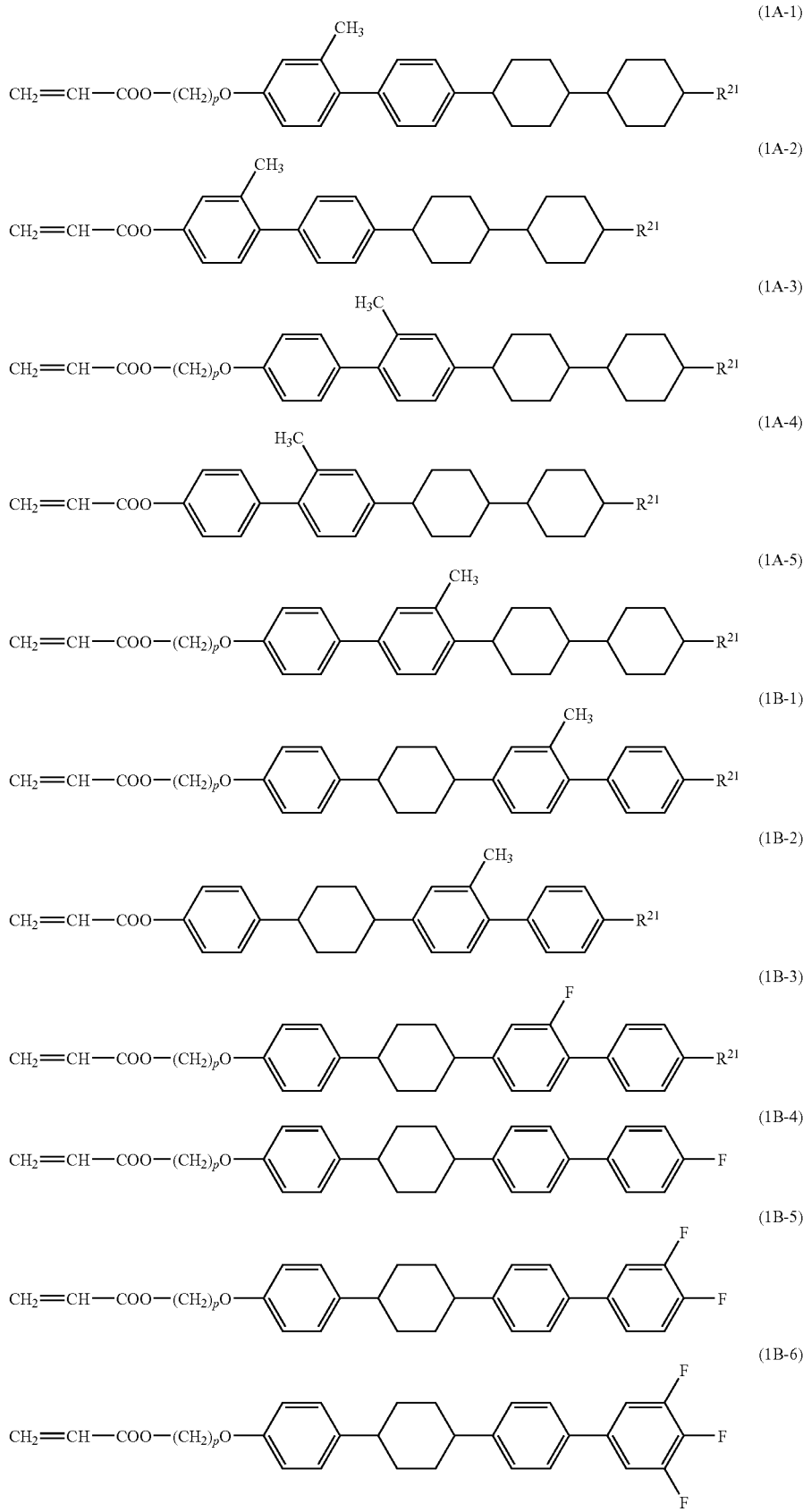

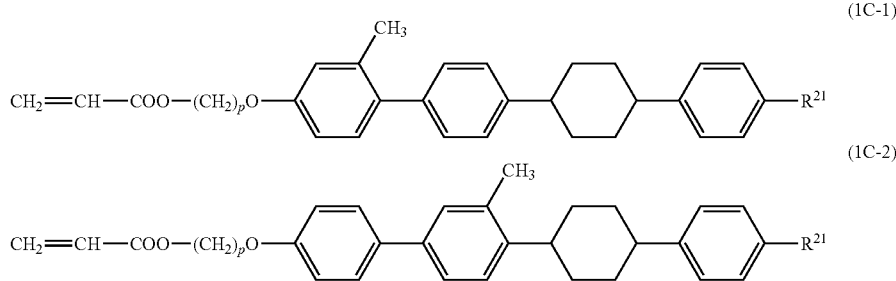

Now, the process for producing the compound (1) of the present invention will be described with reference to specific examples (provided that symbols in the formulae are as defined above).

Preparation Process 1

With respect to the compound (1A) of the present invention, the following process may be mentioned, for example, as a process for producing the above compound (1A-1).

Firstly, the following compound (11) and the following compound (12) are reacted in the presence of palladium acetate to obtain the following compound (13). Then, magnesium is reacted to the compound (13) to prepare a Grignard reagent, which is reacted with the following compound (14) to obtain the following compound (15). Then, the compound (15) and p-toluene sulfonic acid are reacted to obtain the following compound (16). The compound (16) is reacted with hydrogen gas in the presence of a palladium-activated carbon to obtain the following compound (17). Then, the compound (17) and boron tribromide are reacted to obtain the following compound (18). The compound (18) and $CH_2$=CH—COO—$(CH_2)_p$—Br are reacted to obtain the compound (1A-1).

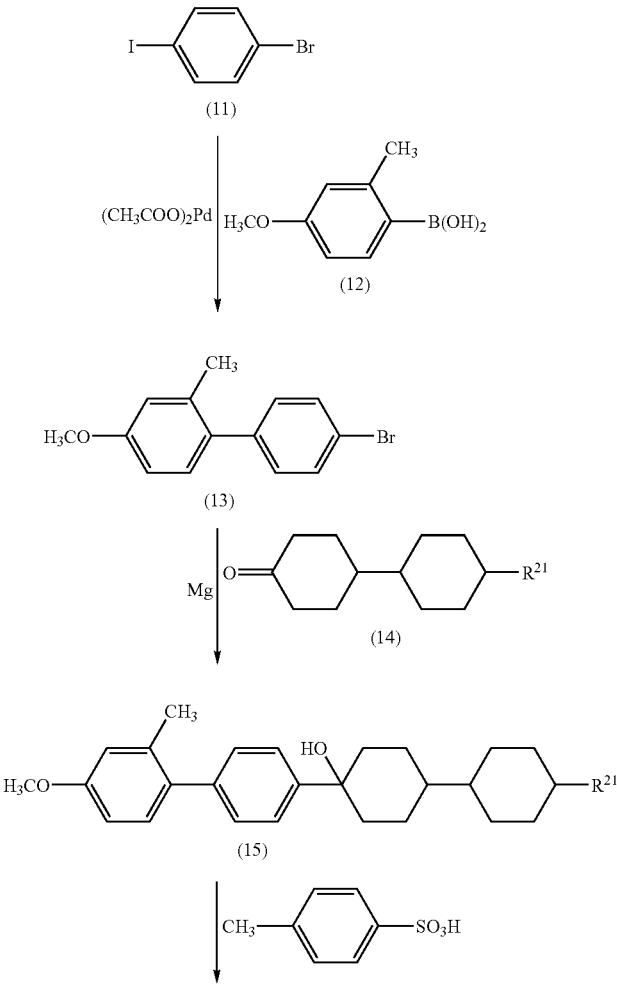

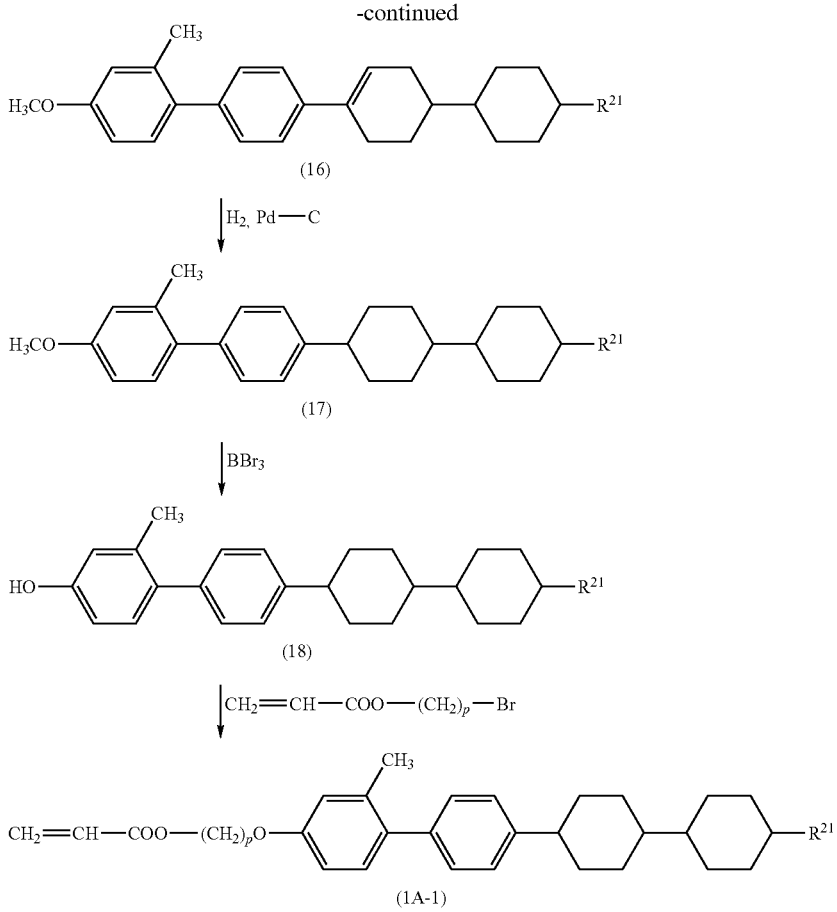

The above compound (1A-3) can be prepared by changing the compound (11) to the following compound (21) and changing the compound (12) to the following compound (19) in the Preparation Process 1. The compound (1A-5) can be prepared by changing the compound (11) to the following compound (20) and changing the compound (12) to the following compound (19) in the Preparation Process 1.

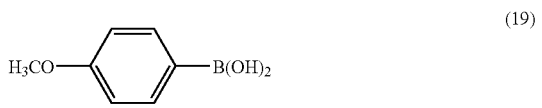

(19)

(20)

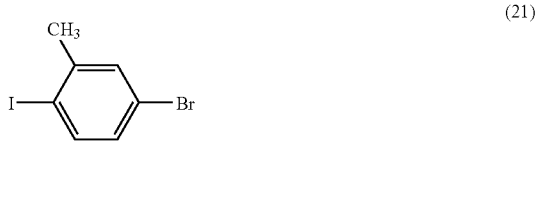

(21)

Further, a compound of the formula (1) wherein $R^1$ is a methyl group may be prepared in the same manner by changing $CH_2=CH-COO-(CH_2)_p-Br$ to $CH_2=C(CH_3)-COO-(CH_2)_p-Br$.

Further, a compound wherein $R^1$ is a hydrogen atom and k is 0 (i.e. a compound containing no L), such as compound (1A-2) or compound (1A-4), can be prepared by changing $CH_2=CH-COO-(CH_2)_p-Br$ to acrylic acid chloride.

Preparation Process 2

With respect to the compound (1B) of the present invention, the following process may be mentioned, for example, as a process for producing the above compound (1B-1).

Firstly, the following compound (21) and the following compound (22) are reacted in the presence of palladium acetate to obtain the following compound (23). On the other hand, the following compound (24) and dimethyl sulfate are reacted to obtain the following compound (25). Then, the above compound (23) is reacted with magnesium to prepare a Grignard reagent, which is reacted with the above compound (25) to obtain the following compound (26). Then, the compound (26) and p-toluene sulfonic acid are reacted to obtain the following compound (27). The compound (27) is reacted with hydrogen gas in the presence of palladium-activated carbon to obtain the following compound (28). Then, the compound (28) and boron tribromide are reacted to obtain the following compound (29). The compound (29) and $CH_2=CH-COO-(CH_2)_p-Br$ are reacted to obtain compound (1B-1).

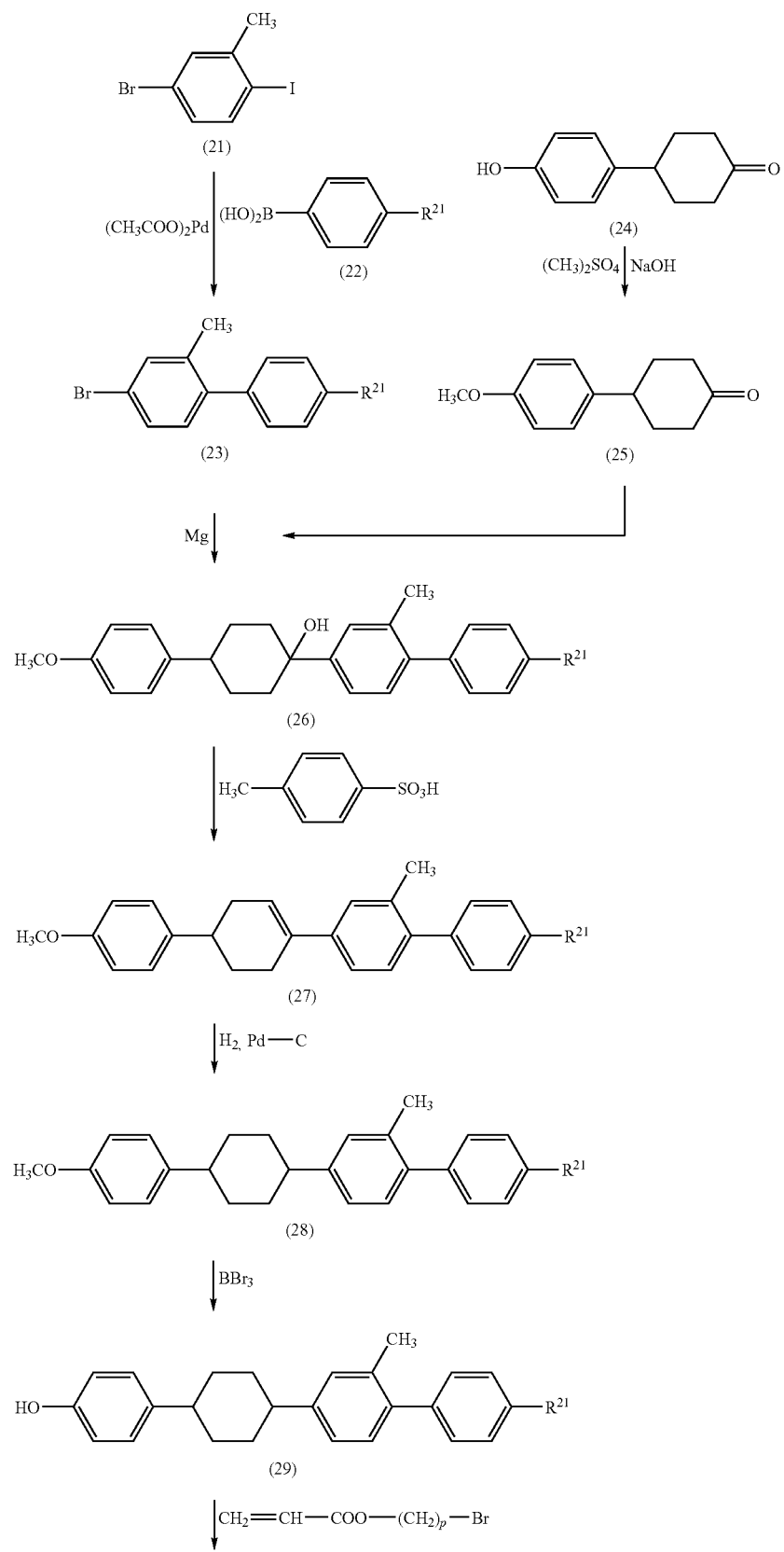

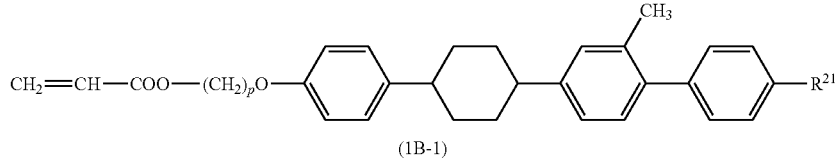

(1B-1)

Further, a compound wherein $R^1$ is a methyl group may be prepared in the same manner by changing $CH_2$=CH—COO—$(CH_2)_p$—Br to $CH_2$=C($CH_3$)—COO—$(CH_2)_p$—Br.

Further, compound (1B-2) can be prepared by changing $CH_2$=CH—COO—$(CH_2)_p$—Br to acrylic acid chloride.

With respect to the compound (1B), a compound having a 1,4-phenylene group substituted by at least one fluorine atom (such as compound (1B-3), compound (1B-4) or compound (1B-5)) can be prepared by the following process.

Namely, the following compound (41) and the following compound (42) are reacted in the presence of palladium acetate to obtain the following compound (43) (provided that in the formulae, each of X and Y which are independent of each other, is a hydrogen atom or a fluorine atom, Z is a hydrogen atom, a $C_{1-8}$ alkyl group or is a fluorine atom, and at least one of X, Y and Z is a fluorine atom). This compound (43) is subjected to reactions for compounds (46) to (49) in the same manner as for the above compounds (26) to (29), to obtain a compound containing a 1,4-phenylene group substituted by at least one fluorine group, such as compound (1B-3), etc.

Further, in order to obtain the compound (1B-6) or the like, similar reactions may be carried out by using a compound having a substituent W provided at the ortho position of the substituent Z of the following compound (42) (the ortho position on the side opposite to the substituent Y). In this case, in the formulae, each of W, X and Y which are independent of one another, is a hydrogen atom or a fluorine atom, and Z is a hydrogen atom, a $C_{1-8}$ alkyl group or a fluorine atom, and at least one of W, X, Y and Z is a fluorine atom.

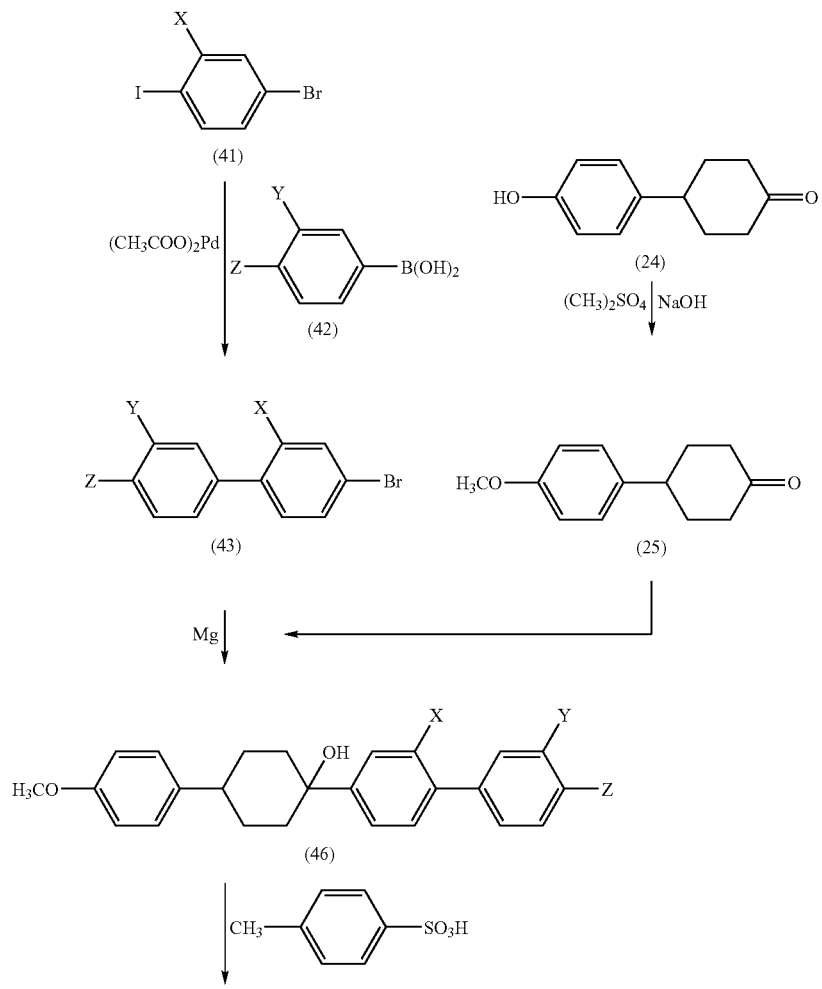

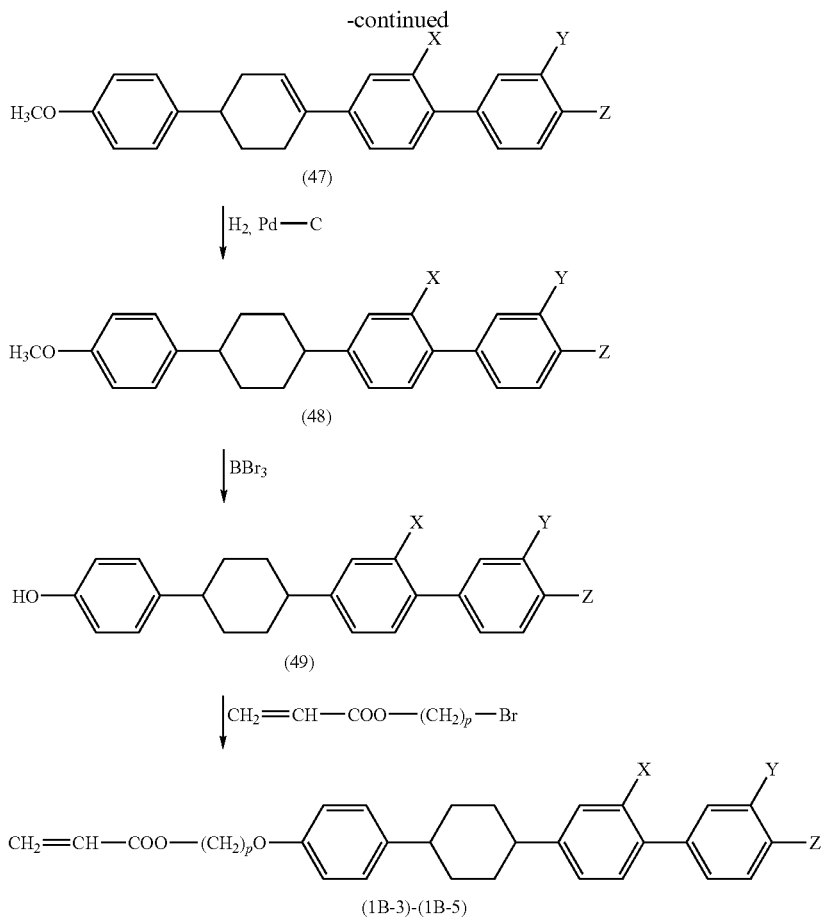

Preparation Process 3

With respect to the compound (1C) of the present invention, the following process may be mentioned, for example, as a process for preparing the above compound (1C-1).

Firstly, the following compound (31) is reacted with magnesium to prepare a Grignard reagent, which is reacted with the following compound (32) to obtain the following compound (33). Then, the compound (33) is reacted with trifluoroacetic acid to obtain the following compound (34). The compound (34) is reacted with hydrogen gas in the presence of palladium-activated carbon to obtain the following compound (35). On the other hand, in the same manner as described above, the following compound (II) is and the following compound (12) are reacted in the presence of palladium acetate to obtain the following compound (13). Then, the compound (13) is reacted with magnesium to prepare a Grignard reagent, which is reacted with the above compound (35) to obtain the following compound (36). Then, the compound (36) and p-toluene sulfonic acid are reacted to obtain the following compound (37). The compound (37) is reacted with hydrogen gas in the presence of palladium-activated carbon to obtain the following compound (38). Then, the compound (38) and boron tribromide are reacted to obtain the following compound (39). The compound (39) and $CH_2=CH-COO-(CH_2)_p-Br$ are reacted to obtain the compound (1C-1)

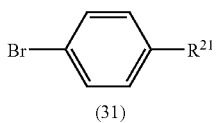

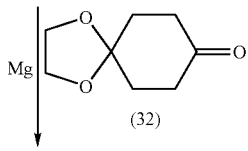

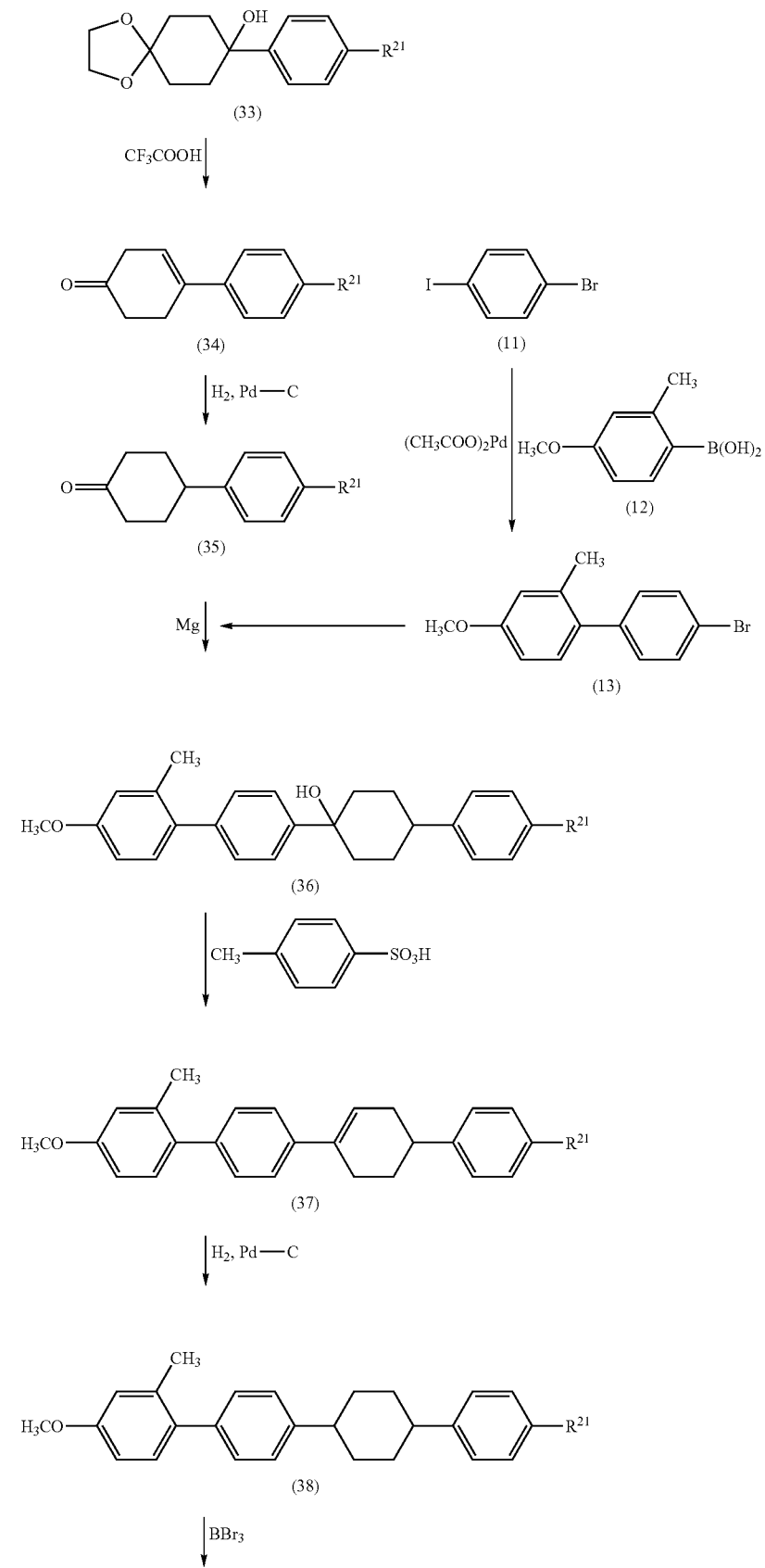

-continued

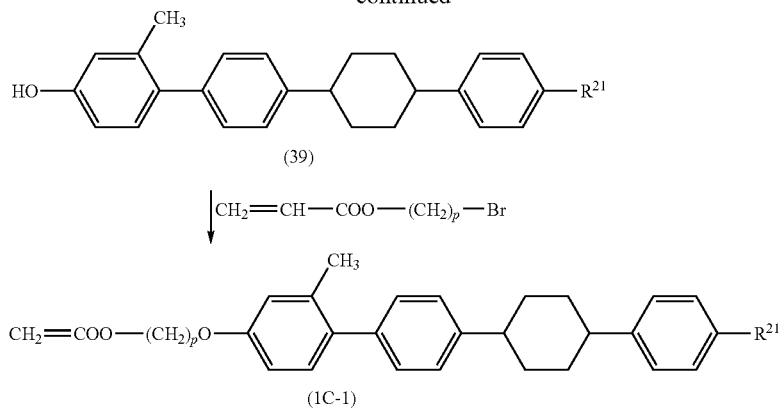

The compound (1C-2) can be prepared by changing the compound (II) to the above compound (20) and changing the compound (12) to the above compound (19) in the Preparation Process 3.

Further, a compound wherein $R^1$ is a methyl group can also be prepared in the same manner by changing $CH_2$=CH—COO—$(CH_2)_p$—Br to $CH_2$=$C(CH_3)$—COO—$(CH_2)_p$—Br.

Still further, a compound wherein $R^1$ is a hydrogen atom and k is 0 (i.e. a compound containing no L) can be prepared by changing $CH_2$=CH—COO—$(CH_2)_p$—Br to acrylic acid chloride.

The compound (1) of the present invention has a structure wherein four cyclic groups are directly bonded, whereby the durability against a blue laser beam is excellent. Further, it contains no -Ph-CO— structure and has -Cy- being a cyclic saturated hydrocarbon group showing no light absorption even in a short wavelength region where the wavelength is at most 400 nm, whereby absorption of a blue laser beam is low. Further, it has -Ph- (particularly in a case where it has at least two Ph), Δn can be made large.

Further, usually, when a polymerizable liquid crystal is polymerized, the value of Δn tends to decrease after the polymerization. However, in a case where a structure having a polymethylene group is bonded to an acryloyl group or a methacryloyl group, i.e. in a case where the -L- moiety is —$(CH_2)_pO$— or —$(CH_2)_q$—, it is possible to suppress the decrease of the Δn value. Thus, in a case where an optical element obtainable by using the compound (1) is utilized for an optical head device, it is possible to obtain a good light utilization efficiency.

Further, when an optical element made of an organic substance such as liquid crystal is disposed in an optical system and used as an optical head device, aberration is likely to occur as the time passes. In a case where an optical element made of an organic substance is used, it is difficult to completely eliminate a damage by a laser beam, but it is desirable to suppress such a damage as far as possible. By using an optical element prepared by utilizing the compound (I), it is possible to suppress occurrence of aberration after a blue laser beam exposure accelerated test. Namely, it is possible to suppress occurrence of aberration even in a case where it is subjected to irradiation with a laser beam (particularly a blue laser beam) over a long period of time, whereby the light utilization efficiency can be maintained over a long period of time.

Thus, by using the compound (1), it is possible to provide an optical anisotropic material and an optical element which have adequate durability against a blue laser beam and which is excellent also in a property such as a phase difference. Particularly in a case where k is 1, the compound (1) is capable of maintaining the inherent large Δn value even after the polymerization, whereby it is possible to provide an optical anisotropic material and an optical element having better properties. Further, even in a case irradiated with a blue laser beam, occurrence of aberration is suppressed, and it is possible to provide an optical head device having high durability and reliability.

The compound (1) of the present invention is used preferably as one component of a liquid crystal composition to obtain a polymer liquid crystal. In such a case, the compound (1) of the present invention shows a sufficiently broad liquid crystal temperature range by itself and has such a characteristic that the temperature range in which the compound shows a liquid crystal phase is broad particularly in a high temperature side. However, in order that the liquid crystal composition to obtain a polymer liquid crystal shows liquid crystallinity also in a low temperature side, the liquid crystal composition is preferably a liquid crystal composition containing at least two compounds selected from the compounds (I) or a liquid crystal composition containing at least one compound (1) and at least one polymerizable liquid crystal other than the compound (1). By the use of such a liquid crystal composition, the temperature range in which the liquid crystal composition shows a liquid crystal phase can be made broader. Further, due to a drop in the melting point (Tm), the handling efficiency will improve. The polymerizable liquid crystal other than the compound (1) will be referred to as the compound (3).

In a case where a liquid crystal composition contains the compound (1) and the compound (3), the compound (3) is preferably a compound having an acryloyl group or a methacryloyl group, particularly preferably a compound having an acryloyl group. Further, such a polymerizable liquid crystal being the compound (3) preferably has high durability against a blue laser beam, and accordingly, it is preferred that its mesogen structure contains no -Ph-CO— structure.

The compound (3) is preferably a compound represented by the following formula (3-1) (compound (3-1)) or a compound represented by the following formula (3-2) (compound (3-2)).

$$CH_2=CR^3-COO-(M)_m-E^5-E^6-E^7-R^4 \quad (3-1)$$

$$CH_2=CR^5-COO-(N)_n-E^8-E^9-R^6 \quad (3-2)$$

provided that the symbols in the formulae have the following meanings.

$R^3$, $R^5$: each independently a hydrogen atom or a methyl group.

$R^4$, $R^6$: each independently a $C_{1-8}$ alkyl group.

m, n: each independently 0 or 1.

M, N: each independently $-(CH_2)_s O-$ or $-(CH_2)_t-$ (provided that each of s and t which are independent of each other, is an integer of from 2 to 8).

$E^5$, $E^6$, $E^7$, $E^8$, $E^9$: each independently a 1,4-phenylene group or a trans-1,4-cyclohexylene group, provided that at least one of $E^5$, $E^6$ and $E^7$ is a trans-1,4-cyclohexylene group.

However, the above 1,4-phenylene group and trans-1,4-cyclohexylene group may be such that a hydrogen atom bonded to a carbon atom in each group may be substituted by a fluorine atom, a chlorine atom or a methyl group.

Among these compounds, preferred are the following compounds (3-1-1), (3-1-2) and (3-2-1). Particularly preferred is the following compound (3-1-1).

$$CH_2=CR^3-COO-Ph-Cy-Ph-R^4 \quad (3-1-1)$$

$$CH_2=CR^3-COO-Ph-Ph-Cy-R^4 \quad (3-1-2)$$

$$CH_2=CR^5-COO-Cy-Cy-R^6 \quad (3-2-1)$$

The liquid crystal composition for the production of a polymer liquid crystal is a liquid crystal composition containing at least 75 mass % of the polymerizable liquid crystal, preferably a liquid crystal composition containing at least 90 mass % of the polymerizable liquid crystal. Such a liquid crystal composition may contain a non-liquid crystalline polymerizable compound or a non-polymerizable liquid crystal compound. The liquid crystal composition is preferably a liquid crystal composition which does not substantially contain a non-liquid crystalline polymerizable compound or a non-polymerizable liquid crystal compound and which contains at least 90 mass %, particularly preferably at least 95 mass %, of the polymerizable liquid crystal. In the present invention, the liquid crystal composition for the production of a polymer liquid crystal is preferably a liquid crystal composition which contains at least 5 mass % of the compound (1) to the entire polymerizable liquid crystal in the liquid crystal composition.

In the present invention, the liquid crystal composition suitable for the production of a polymer liquid crystal is, as mentioned above, a liquid crystal composition containing at least two compounds (1), or a liquid crystal composition containing at least one compound (1) and at least one compound (3). The proportion of the compound (1) based on the total amount of the compound (1) and the compound (3) in such a liquid is crystal composition is preferably from 30 to 100 mass %, particularly preferably from 50 to 100 mass %. In a liquid crystal composition containing the compound (1) and the compound (3), the upper limit of the proportion of the compound (1) based on the total amount of the compound (1) and the compound (3) is preferably 95 mass %.

Further, the compound (3) has a low molecular weight as compared with the compound (1) in many cases. Therefore, the molar ratio of the compound (1) to the total amount of the compound (1) and the compound (3) tends to be smaller than the mass ratio in many cases. Accordingly, when represented by the molar ratio, the proportion of the compound (1) based on the total amount of the compound (1) and the compound (3) is preferably at least 20 mol %, more preferably at least 30 mol %. In a liquid crystal composition containing the compound (1) and the compound (3), the upper limit of the proportion of the compound (1) based on the total amount of the compound (1) and the compound (3) is preferably 90 mol %. For example, in a case where the above compound (3-1-1) is used as the compound (3), the proportion of the compound (1) based on the entire polymerizable liquid crystal (which may contain other compound (3) in addition to the compound (1) and the compound (3-1-1)) is preferably at least 20 mol %, particularly preferably from 20 to 70 mol %.

The liquid crystal composition of the present invention may contain a component (hereinafter referred to as another component) other than the polymerizable liquid crystal. Such another component may, for example, be a polymerization initiator, a polymerization inhibitor, a chiral compound, an ultraviolet absorber, an antioxidant, a photostabilizer or a dichroic dye.

The total amount (hereinafter referred to as the "total amount of the liquid crystal") of the polymerizable liquid crystal contained in the liquid crystal composition, and the proportion of another component, are preferably adjusted depending upon the purpose of use. For example, in a case where a chiral compound is used as another component, the total amount of the liquid crystal is preferably from 20 to 95 mass %, particularly preferably from 50 to 95 mass % based on the liquid crystal composition. The amount of the chiral compound is preferably from 5 to 80 mass %, particularly preferably from 5 to 50 mass % based on the liquid crystal composition.

In a case where a dichroic dye is used as another component, the total amount of the liquid crystal is preferably from 80 to 99 mass %, particularly preferably from 82 to 97 mass % based on the liquid crystal composition. The amount of the dichroic dye is preferably from 1 to 20 mass %, particularly preferably from 3 to 18 mass % based on the liquid crystal composition.

In a case where an ultraviolet absorber, an antioxidant, a photostabilizer or the like is used as another component, the amount of the such a component is preferably at most 5 mass %, particularly preferably at most 2 mass % based on the liquid crystal composition. The total amount of the liquid crystal in such a case is preferably from 95 to less than 100 mass %, particularly preferably from 98 to less than 100 mass % based on the liquid crystal composition. The proportion of the polymerization initiator will be described hereinafter.

Now, the optical anisotropic material of the present invention will be described below. The optical anisotropic material of the present invention is made of a polymer obtained by subjecting the above liquid crystal composition to polymerization in a state where the liquid crystal composition shows a liquid crystal phase and in a state where the liquid crystal is aligned.

In order to keep the state where the liquid crystal composition shows a liquid crystal phase, the temperature of the atmosphere may be kept to be at most the nematic phase-isotropic phase transition temperature ($T_c$), but Δn of the liquid crystal composition is extremely small at a temperature in the vicinity of $T_c$. Therefore, the upper limit of the temperature of the atmosphere is preferably at most $(T_c-10)°$ C.

The polymerization may, for example, be photopolymerization or heat polymerization, and photopolymerization is preferred. The light to be used for the photopolymerization is preferably ultraviolet light or visible light. In the case of photopolymerization, a photopolymerization initiator is preferably used, which is properly selected from acetophenones, benzophenones, benzoins, benzyls, Michler's ketones, benzoin alkyl ethers, benzyl dimethyl ketals and thioxanthones. Such photopolymerization initiators may be used alone or in combination of two or more of them. The amount of the photopolymerization initiator is preferably from 0.1 to 5 mass %, particularly preferably from 0.3 to 2 mass %, based on the entire amount of the liquid crystal composition.

Now, the optical element of the present invention will be described. The optical element of the present invention is obtained by sandwiching the above liquid crystal composition between a pair of supports having alignment treatment applied thereto and subjecting the liquid crystal composition to polymerization in a state where the liquid crystal composition shows a liquid crystal phase and in a state where the liquid crystal is aligned.

The supports are preferably supports having alignment treatment applied to a transparent substrate made of glass or a resin. The alignment treatment is carried out preferably by e.g. a method of directly rubbing the surface of the transparent substrate with e.g. fibers such as cotton, wool, nylon or polyester, a method of laminating a polyimide alignment film on the surface of the transparent substrate and then rubbing the surface of the alignment film with the above fibers, or a method of oblique evaporation of an inorganic material on the surface of the transparent substrate.

Then, spacers such as glass beads are placed on the surface to which alignment treatment has been applied, and a plurality of such supports are disposed to face each other with a desired space, and the liquid crystal composition is sandwiched between the supports, followed by the polymerization. The polymerization may be carried out in the same manner as in the polymerization to prepare the optical anisotropic material. The optical element prepared by the polymerization may be used as it is, as sandwiched between the supports, or it may be peeled from the supports and then used. The optical element of the present invention is an element containing such a polymer and is preferably made of the polymer as sandwiched between the supports.

The optical anisotropic material and the optical element of the present invention have high durability against a blue laser beam and thus are useful for an optical anisotropic material and an optical element through which such a laser beam is transmitted. Particularly, they are useful as an optical anisotropic material to be used to modulate the phase state and/or wavefront state of the laser beam and an optical element having a member comprising the optical anisotropic material. For example, the optical element may be used as mounted on an optical head device as a diffraction element such as a polarizing hologram, a phase plate, or the like. As a polarizing hologram, there may, for example, be a case where signal lights due to the reflection of lights emitted from a laser light source on an information recorded surface of an optical disk, are separated and then introduced into a photo-receiving element. As a phase plate, there may be a case where it is used as a half wavelength plate, to control the phase difference of the light emitted from a laser light source, or a case where it is installed as a quarter wavelength plate in an optical path to stabilize the output of the laser light source. As other uses, a phase plate, a polarizer, etc. for projectors may be mentioned.

EXAMPLES

Now, the present invention will be described in detail with reference to Preparation Examples for the compounds of the present invention. However, it should be understood that the preparation of the compounds of the present invention is by no means restricted to such Examples.

Preparation Example 1

Preparation Example for Compound (1A-1a)

Example 1-1

Preparation Example for Compound (13)

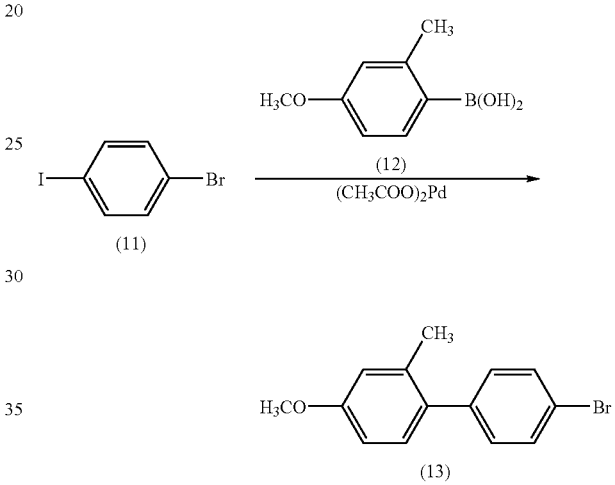

Into a 1,000 mL four-necked flask equipped with a reflux condenser, a stirrer and a dropping apparatus, the compound (11) (22.34 g, 0.079 mol), the compound (12) (14.44 g, 0.087 mol), palladium acetate (0.90 g, 0.004 mol) and triphenyl phosphine (2.07 g, 0.008 mol) were added. Acetone (200 mL) and a 2 mol/L sodium hydrogen carbonate aqueous solution (250 mL) were added thereto in a nitrogen stream, followed by refluxing at 65° C. for 18 hours with stirring. After completion of the reaction, water and diethyl ether were added for liquid separation, and the organic layer was recovered. The recovered organic layer was washed with a saturated sodium chloride aqueous solution (40 mL) and then washed with water, whereupon the organic layer was again recovered. The organic layer was dried over anhydrous magnesium sulfate, followed by filtration under reduced pressure to remove the anhydrous magnesium sulfate. The filtrate was concentrated.

This concentrated filtrate was purified by column chromatography (packed agent: silica gel 60N, manufactured by Kanto Chemical Co., Inc.) using dichloromethane/hexane (volume ratio of 5:5) as a developer. Then, the fraction containing the desired product was concentrated to obtain a powder crystal. To this powder crystal, 100 mL of a solvent mixture of dichloromethane and hexane (volume ratio of dichloromethane/hexane:70/30) was added, and recrystallization was carried out to obtain 16.4 g of the compound (13). The yield was 75%.

Example 1-2

Preparation Example for Compound (15a)

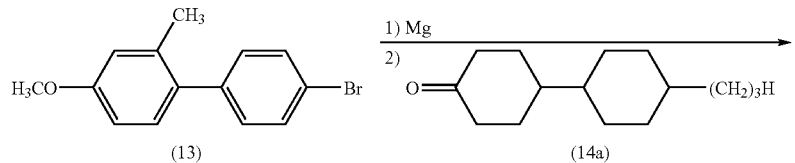

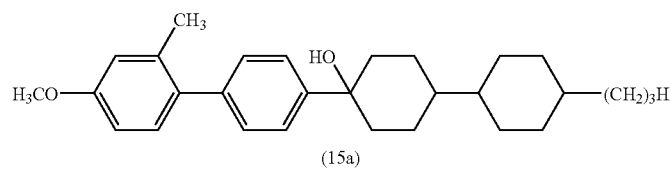

Into a 500 mL four-necked flask equipped with a reflux condenser, a stirrer and a dropping apparatus, magnesium (1.55 g, 0.058 mol) was added, and a solution having the compound (13) (16.0 g, 0.057 mol) obtained in Example 1-1 dissolved in dehydrated tetrahydrofuran (50 mL) was dropwise added over a period of 30 minutes in a nitrogen stream. After completion of the dropwise addition, stirring and refluxing were carried out at 70° C. for 3 hours to prepare a Grignard reagent. Then, this four-necked flask was cooled to 0° C., and a solution having the compound (14a) (12.7 g, 0.057 mol) dissolved in dehydrated tetrahydrofuran (100 mL) was dropwise added over a period of 30 minutes in a nitrogen stream. After completion of the dropwise addition, stirring and refluxing were carried out at 70° C. for 3 hours, and then a 1 mol/L ammonium chloride aqueous solution (100 mL) was added to stop the reaction.

A concentrated filtrate obtained by carrying out post treatment in the same manner as in Example 1-1, was subjected to purification by column chromatography (packed agent: silica gel 60N, manufactured by Kanto Chemical Co., Inc.) using ethyl acetate/hexane (volume ratio of 7:3) as a developer, to obtain 16.8 g of the compound (15a). The yield was 70%.

Example 1-3

Preparation Example for Compound (16a)

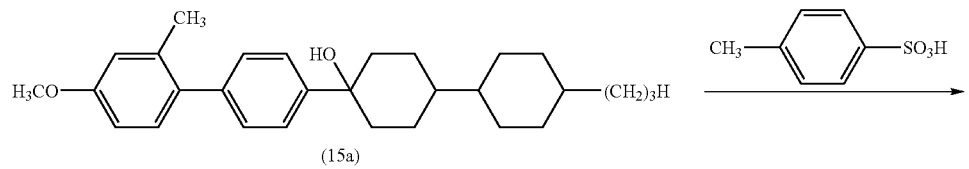

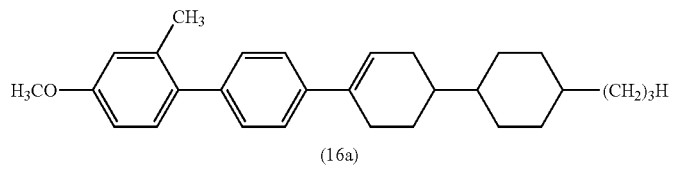

Into a 500 mL egg-plant form flask equipped with a reflux condenser and a stirrer, the compound (15a) (16.5 g, 0.039 mol), p-toluene sulfonic acid monohydrate (0.32 g, 0.002 mol) and toluene (200 mL) were added. An isobaric dropping funnel containing a molecular sieve 4A (20 g) was attached thereto, and stirring and refluxing were carried out at 110° C. for 4 hours. After completion of the reaction, post treatment was carried out in the same manner as in Example 1-1 to obtain 14.9 g of the compound (16a). The yield was 95%.

Example 1-4

Preparation Example for Compound (17a)

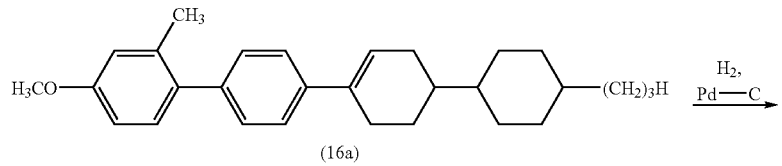

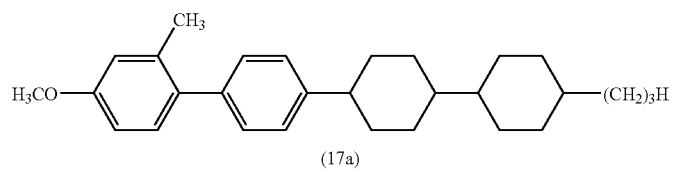

Into a 5,000 mL pressure-resistant reactor, the compound (16a) (14.50 g, 0.036 mol) obtained in Example 1-3, tetrahydrofuran (200 mL) and 10% palladium-activated carbon (2.8 g) were added. While hydrogen was introduced under a pressure of 0.4 MPa, stirring was carried out at 60° C. for 3 hours. After completion of the reaction, celite filtration was carried out to remove the catalyst. The filtrate was concentrated to obtain a cis-trans mixture of the compound represented by the above formula (17a) (13.8 g, 0.034 mol). The yield of the cis-trans mixture was 95%. This cis-trans mixture is a mixture of a compound wherein two cyclohexylene rings contained in the compound represented by the formula (17a) are bonded at trans-positions and a compound wherein such rings are bonded at cis-positions. Hereinafter, a compound wherein two cyclohexylene rings are bonded at trans-positions will be referred to as a trans isomer, and a compound wherein they are bonded at cis-positions will be referred to as a cis isomer.

To such a mixture of isomers, hexane (100 mL) was added, and recrystallization was carried out to obtain a trans isomer of the compound represented by the formula (17a) (2.19 g, 0.0054 mol). Further, the filtrate obtained at the time of recovering the crystal of the trans isomer, was concentrated and put into a 500 mL egg-plant form flask. Then, t-butoxy potassium (28.0 g, 0.25 mol) and N,N-dimethylformamide (300 mL) were added thereto, followed by refluxing at 100° C. for 6 hours with stirring to convert the cis isomer of the compound represented by the formula (17a) to the trans isomer. After completion of the reaction, water (500 mL) was added to stop the reaction, and post treatment was carried out in the same manner as in Example 1-1. To the obtained concentrated filtrate, hexane (200 mL) was added, and recrystallization was carried out to obtain a trans isomer of the compound represented by the formula (17a) (9.32 g). The total amount of the compound (17a) being the trans isomer, was 11.51 g (0.028 mol), and the yield was 79%.

Example 1-5

Preparation Example for Compound (18a)

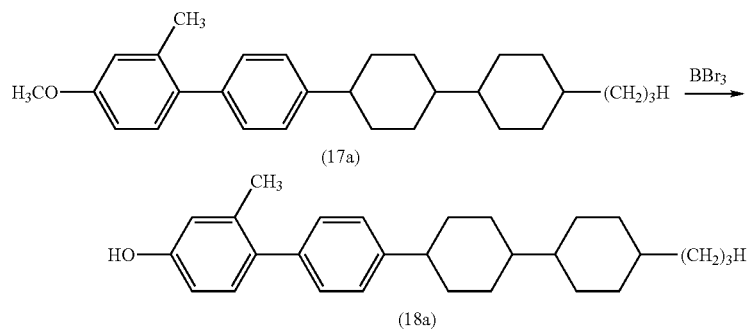

Into a 500 mL four-necked flask equipped with a reflux condenser, a stirrer and a dropping apparatus, the compound (17a) (11.00 g, 0.027 mol) obtained in Example 1-4 and dichloromethane (200 mL) were added. In a nitrogen stream, boron tribromide (33.8 g, 0.135 mol) was dropwise added over a period of 30 minutes. The dropwise addition operation was carried out under cooling with ice so that the internal temperature did not exceed 10° C. Stirring was continued at room temperature for 3 hours, and then, water was added to stop the reaction, whereupon post treatment was carried out in the same manner as in Example 1-1. The obtained concentrated filtrate was recrystallized by means of 200 mL of a solvent mixture of dichloromethane and hexane (volume ratio of dichloromethane/hexane:70/30) to obtain 10.01 g of the compound (18a). The yield was 95%.

Example 1-6

Preparation Example for Compound (1A-1a)

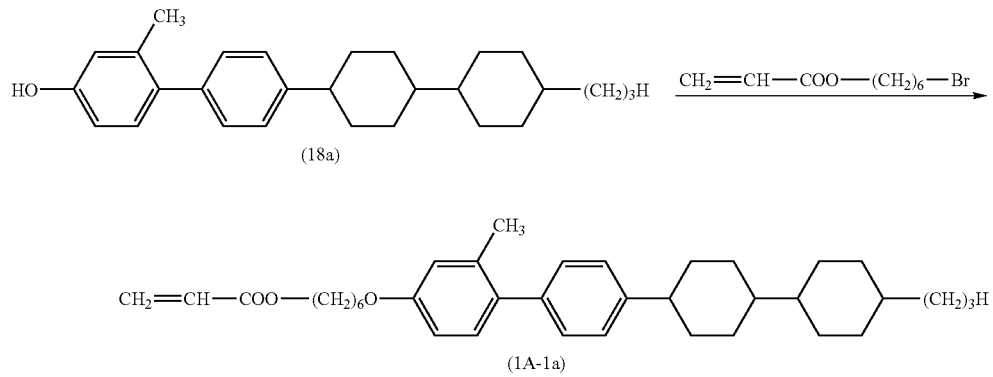

Into a 500 mL four-necked flask equipped with a reflux condenser, a stirrer and a dropping apparatus, the compound (18a) (9.60 g, 0.025 mol) obtained in Example 1-5, $CH_2$=CH—COO—$(CH_2)_6$—Br (7.60 g, 0.027 mol), potassium carbonate (6.09 g, 0.043 mol), potassium iodide (0.60 g, 0.0037 mol) and acetone (500 mL) were added, followed by stirring and refluxing at 60° C. for 24 hours. After completion of the reaction, post treatment and recrystallization were carried out in the same manner as in Example 1-1 to obtain 9.8 g of the compound (1A-1a). The yield was 72%.

The $^1$HNMR spectrum of the compound (1A-1a) is shown below.

$^1$HNMR (400 MHz, solvent: $CDCl_3$, internal standard: TMS) δ (ppm): 0.98 (t, 3H), 1.2-1.9 (m, 31H), 2.34 (s, 3H), 2.72 (m, 1H), 3.94 (t, 2H), 4.15 (t, 2H), 5.8-6.4 (m, 3H), 6.64 (dd, 2H), 7.1-7.3 (dd, 5H)

The phase transition temperature from the crystal phase to the nematic phase of the compound (1A-1a) was 105° C. Further, Δn of the compound (1A-1a) against a laser beam having a wavelength of 589 nm at 80° C. was 0.1305 (extrapolation value).

Preparation Example 2

Preparation Example for Compound (1A-2a)

Into a 500 mL four-necked flask equipped with a reflux condenser, a stirrer and a dropping apparatus, the compound (18a) (9.60 g, 0.025 mol) obtained in Example 1-5, triethylamine (3.85 g, 0.038 mol) and dehydrated tetrahydrofuran (300 mL) were added. In a nitrogen stream, acrylic acid chloride (2.49 g, 0.028 mol) was dropwise added under cooling with ice so that the internal temperature would not exceed 20° C., followed by stirring for 24 hours. After completion of the reaction, post treatment and recrystallization were carried out in the same manner as in Example 1-1 to obtain 10.6 g of the compound (1A-2a). The yield was 95%.

The $^1$HNMR spectrum of the compound (1A-2a) is shown below.

$^1$HNMR (400 MHz, solvent: $CDCl_3$, internal standard: TMS) δ (ppm): 0.98 (t, 3H), 1.25-1.87 (m, 23H), 2.35 (s, 3H), 2.72 (m, 1H), 5.71-6.35 (m, 3H), 6.95 (dd, 2H), 7.20 (dd, 2H), 7.32-7.45 (m, 3H)

The phase transition temperature from the crystal phase to the nematic phase of the compound (1A-2a) was 120° C. Further, Δn of the compound (1A-2a) against a laser beam having a wavelength of 589 nm at 90° C. was 0.1419 (extrapolation value).

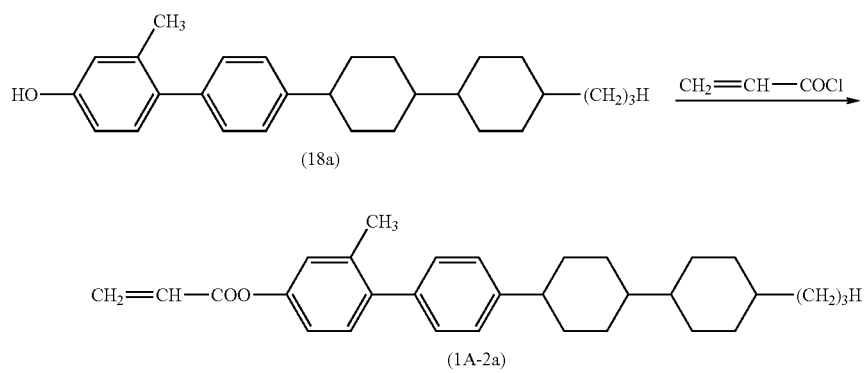

Preparation Example 3

Preparation Example for Compound (1A-3b)

Example 3-1

Preparation Example for Compound (13b)

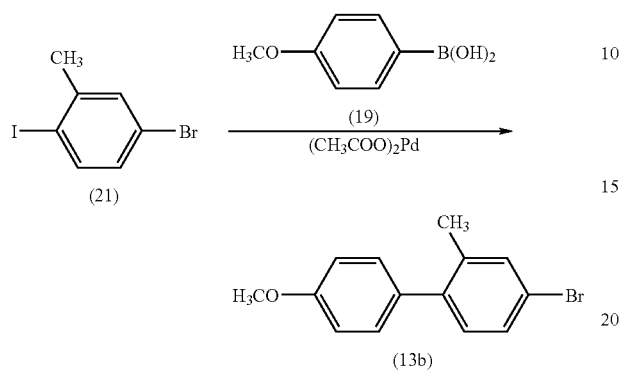

Into a 1,000 mL four-necked flask equipped with a reflux condenser, a stirrer and a dropping apparatus, the compound (21) (16.62 g, 0.056 mol), the compound (19) (9.37 g, 0.062 mol), palladium acetate (0.64 g, 0.003 mol) and triphenylphosphine (1.47 g, 0.006 mol) were added. In a nitrogen stream, acetone (200 mL) and a 2 mol/L sodium hydrogen carbonate aqueous solution (180 mL) were added thereto, followed by stirring and refluxing at 65° C. for 18 hours. After completion of the reaction, post treatment and column chromatography purification were carried out in the same manner as in Example 1-1 to obtain 11.3 g of the compound (13b). The yield was 73%.

Example 3-2

Preparation Example for Compound (15b)

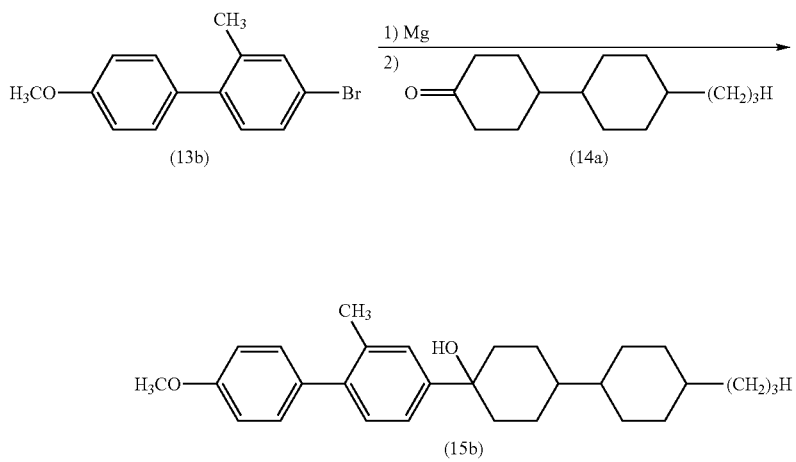

Into a 500 mL four-necked flask equipped with a reflux condenser, a stirrer and a dropping apparatus, magnesium (1.17 g, 0.044 mol) was added, and a solution having the compound (13b) (11.0 g, 0.040 mol) obtained in Example 3-1 dissolved in dehydrated tetrahydrofuran (50 mL) was dropwise added over a period of 30 minutes in a nitrogen stream. After completion of the dropwise addition, stirring and refluxing were carried out at 70° C. for 3 hours to prepare a Grignard reagent. Then, this four-necked flask was cooled to 0° C., and a solution having the compound (14a) (8.91 g, 0.040 mol) dissolved in dehydrated tetrahydrofuran (100 mL) was dropwise added over a period of 30 minutes in a nitrogen stream. After completion of the dropwise addition, stirring and refluxing were carried out at 70° C. for 3 hours. In the same manner as in Example 1-2, post treatment and purification were carried out to obtain 13.3 g of the compound (15b). The yield was 72%.

Example 3-3

Preparation Example for Compound (16b)

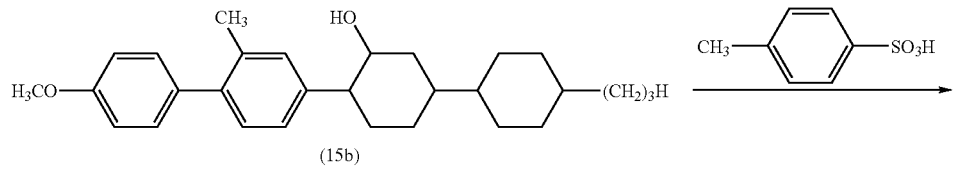

(15b)

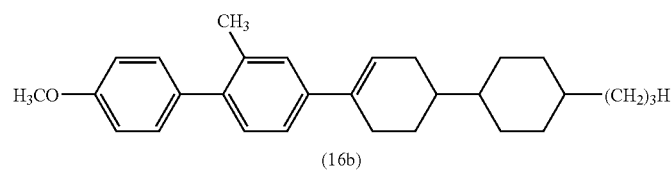

(16b)

Into a 500 mL egg-plant form flask equipped with a reflux condenser and a stirrer, the compound (15b) (13.0 g, 0.031 mol) obtained in Example 3-2, p-toluene sulfonic acid monohydrate (0.25 g, 0.002 mol) and toluene (200 mL) were added. An isobaric dropping funnel containing a molecular sieve 4A (20 g) was attached thereto, and stirring and refluxing were carried out at 110° C. for 4 hours. After completion of the reaction, post treatment was carried out in the same manner as in Example 1-1 to obtain 11.9 g of the compound (16b). The yield was 95%.

Example 3-4

Preparation Example for Compound (17b)

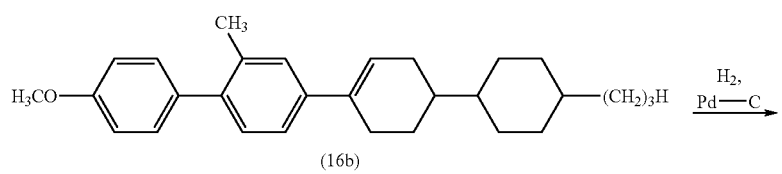

(16b)

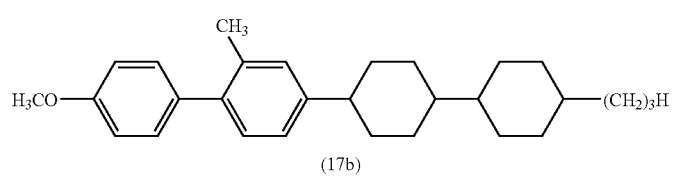

(17b)

Into a 5,000 mL pressure-resistant reactor, the compound (16b) (11.50 g, 0.029 mol) obtained in Example 3-3, tetrahydrofuran (200 mL) and 10% palladium-activated carbon (2.3 g) were added, and in the same manner as in Example 1-4, a cis-trans mixture of the compound represented by the formula (17b) (11.3 g, 0.028 mol) was obtained. The yield was 95%.

Hexane (100 mL) was added thereto, and recrystallization was carried out to obtain a trans isomer of the compound represented by the formula (17b) (1.8 g, 0.0045 mol). Further, one having the filtrate concentrated was transferred to a 500 mL egg-plant form flask, and t-butoxy potassium (22.0 g, 0.22 mol) and N,N-dimethylformamide (300 mL) were added, followed by stirring and refluxing at 100° C. for 6 hours to convert the cis isomer of the compound represented by the formula (17b) to the trans isomer. After completion of the reaction, water (500 mL) was added to stop the reaction, and post treatment was carried out in the same manner as in Example 1-1. Then, a hexane solvent (200 mL) was added, and recrystallization was carried out to obtain a trans isomer of the compound represented by the formula (17b) (7.25 g). The total amount of the compound (17b) being the trans isomer was 9.05 g (0.022 mol), and the yield was 77%.

Example 3-5

Preparation Example for Compound (18b)

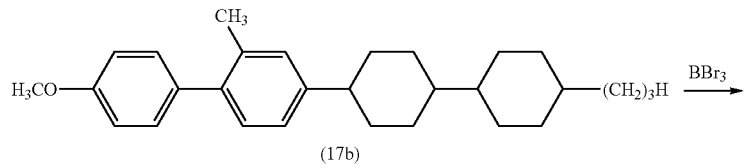

(17b)

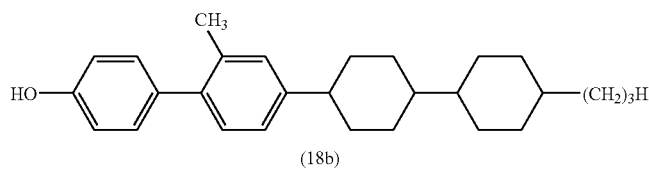

(18b)

Into a 500 mL four-necked flask equipped with a reflux condenser, a stirrer and a dropping apparatus, the compound (17b) (8.80 g, 0.022 mol), obtained in Example 3-4 and dichloromethane (200 mL) were added. In a nitrogen stream, boron tribromide (27.6 g, 0.11 mol) was dropwise added over a period of 30 minutes. Then, the reaction and post treatment were carried out in the same manner as in Example 1-5 to obtain 9.75 g of the compound (18b). The yield was 92%.

Example 3-6

Preparation Example for Compound (1A-3b)

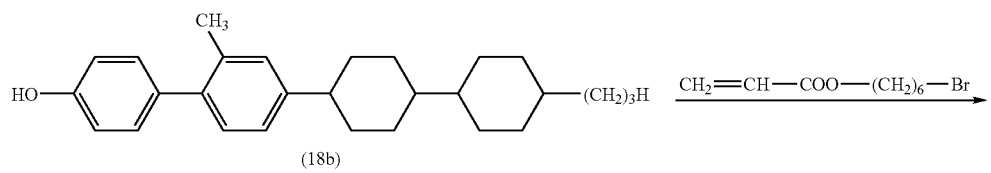

(18b)

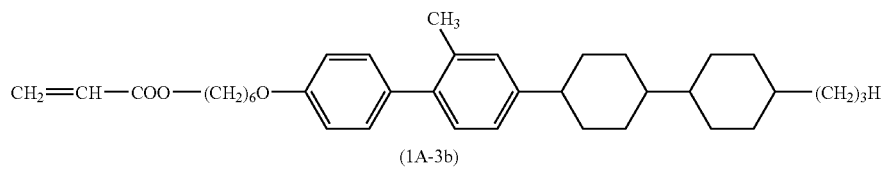

(1A-3b)

Into a 500 mL four-necked flask equipped with a is reflux condenser, a stirrer and a dropping apparatus, the compound (18b) (9.50 g, 0.024 mol) obtained in Example 3-5, $CH_2=CH-COO-(CH_2)_6-Br$ (6.11 g, 0.026 mol), potassium carbonate (5.97 g, 0.043 mol), potassium iodide (0.60 g, 0.0036 mol) and acetone (500 mL) were added, followed by stirring and refluxing at 60° C. for 24 hours. After completion of the reaction, post treatment and recrystallization were carried out in the same manner as in Example 1-1 to obtain 9.15 g of the compound (1A-3b). The yield was 70%.

The $^1$HNMR spectrum of the compound (1A-3b) is shown below.

$^1$HNMR (400 MHz, solvent: CDCl$_3$, internal standard: TMS) δ (ppm): 0.98 (t, 3H), 1.2-1.9 (m, 31H), 2.35 (s, 3H), 2.72 (m, 1H), 3.94 (t, 2H), 4.15 (t, 2H), 5.8-6.4 (m, 3H), 6.83 (dd, 2H), 7.00 (dd, 2H), 7.2-7.4 (dd, 3H)

The phase transition temperature from the crystal phase to the nematic phase of the compound (1A-3b) was 84° C.

Further, Δn of the compound (1A-3b) against a laser beam having a wavelength of 589 nm at 60° C. was 0.1317 (extrapolation value).

Preparation Example 4

Preparation Example for Compound (1A-4-b)

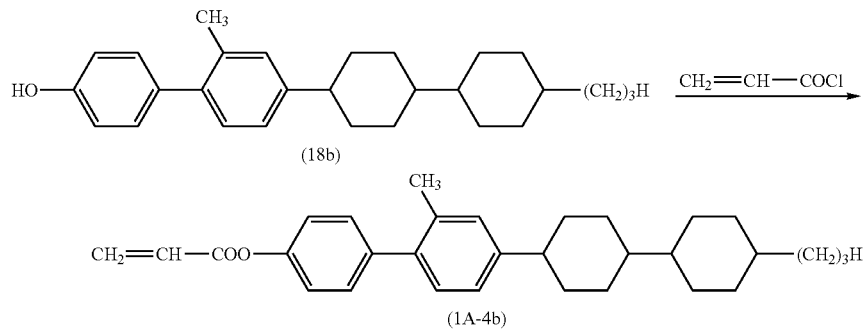

Into a 500 mL four-necked flask equipped with a reflux condenser, a stirrer and a dropping apparatus, the compound (18b) (9.50 g, 0.024 mol) obtained in Example 3-5, triethylamine (3.64 g, 0.036 mol) and dehydrated tetrahydrofuran (300 mL) were added. In a nitrogen stream, acrylic acid chloride (2.39 g, 0.026 mol) was dropwise added under cooling with ice so that the inner temperature would not exceed 20° C., followed by stirring for 24 hours. After completion of the reaction, post treatment and recrystallization were carried out in the same manner as in Example 1-1 to obtain 10.2 g of the compound (1A-4-b). The yield was 96%.

The $^1$HNMR spectrum of the compound (1A-4-b) is shown below.

$^1$HNMR (400 MHz, solvent: CDCl$_3$, internal standard: TMS) δ (ppm): 0.97 (t, 3H), 1.25-1.87 (m, 23H), 2.35 (s, 3H), 2.72 (m, 1H), 5.71-6.35 (m, 3H), 6.99 (dd, 2H), 7.15 (dd, 2H), 7.28 (d, 1H), 7.43 (d, 2H)

The phase transition temperature from the crystal phase to the nematic phase of the compound (1A-4-b) was 104° C. Further, Δn of the compound (1A-4-b) against a laser beam having a wavelength of 589 nm at 80° C. was 0.1639 (extrapolation value).

Preparation Example 5

Preparation Example for Compound (1A-5c)

Example 5-1

Preparation of Compound (13c)

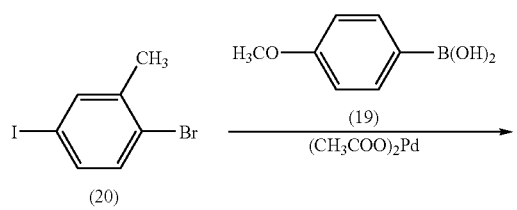

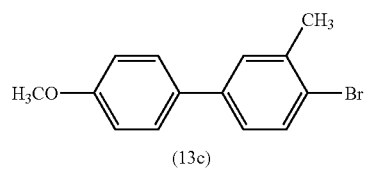

Into a 1,000 mL four-necked flask equipped with a reflux condenser, a stirrer and a dropping apparatus, the compound (20) (14.85 g, 0.050 mol), the compound (19) (8.41 g, 0.055 mol), palladium acetate (0.57 g, 0.003 mol), and triphenylphosphine (1.31 g, 0.005 mol) were added. In a nitrogen stream, acetone (200 mL) and a 2 mol/L sodium hydrogen carbonate aqueous solution (160 mL) were added thereto, followed by stirring and refluxing at 65° C. for 18 hours. After completion of the reaction, post treatment and column chromatography purification were carried out in the same manner as in Example 1-1 to obtain 9.7 g of the compound (13c). The yield was 70%.

Example 5-2

Preparation Example for Compound (15c)

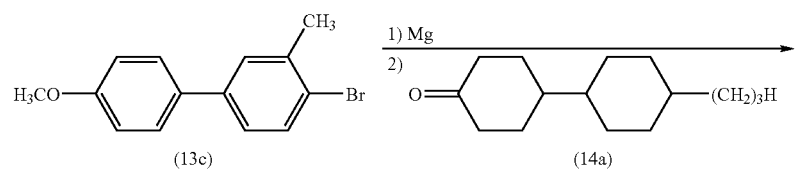

-continued

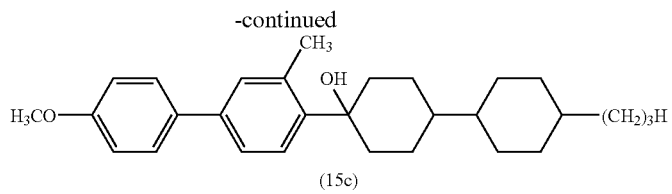
(15c)

Into a 500 mL four-necked flask equipped with a reflux condenser, a stirrer and a dropping apparatus, magnesium (0.94 g, 0.039 mol) was added, and a solution having the compound (13c) (9.6 g, 0.035 mol) obtained in Example 5-1 dissolved in dehydrated tetrahydrofuran (50 mL) was dropwise added over a period of 30 minutes in a nitrogen stream. After completion of the dropwise addition, stirring and refluxing were carried out at 70° C. for 3 hours to prepare a Grignard reagent. Then, this four-necked flask was cooled to 0° C., and a solution having the compound (14a) (8.67 g, 0.039 mol) dissolved in dehydrated tetrahydrofuran (100 mL) was dropwise added over a period of 30 minutes in a nitrogen stream. After completion of the dropwise addition, the reaction, post treatment and purification were carried out in the same manner as in Example 1-2, to obtain 11.2 g of the compound (15c). The yield was 68%.

Example 5-3

Preparation Example for Compound (16c)

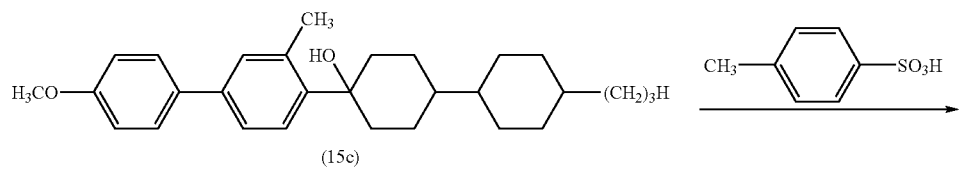

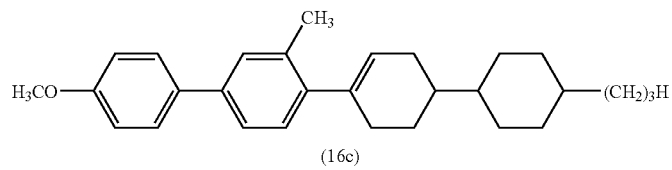
(16c)

Into a 500 mL egg-plant form flask equipped with a reflux condenser and a stirrer, the compound (15c) (10.8 g, 0.027 mol) obtained in Example 5-2, p-toluene sulfonic acid monohydrate (0.22 g, 0.002 mol) and toluene (200 mL) were added. An isobaric dropping funnel containing a molecular sieve 4A (20 g) was attached thereto, and stirring and refluxing were carried out at 110° C. for 4 hours. After completion of the reaction, post treatment was carried out in the same manner as in Example 1-1 to obtain 10.4 g of the compound (16c). The yield was 96%.

Example 5-4

Preparation Example for Compound (17c)

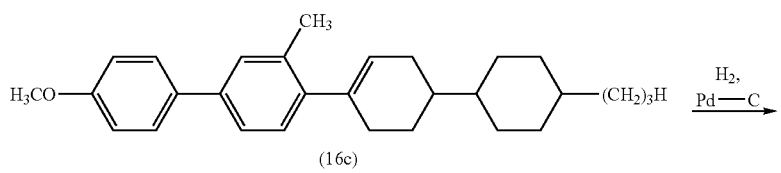
(16c)

-continued

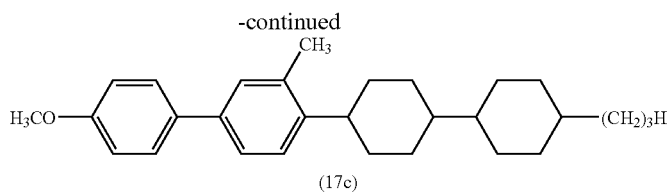

(17c)

Into a 5,000 mL pressure-resistant reactor, the compound (16c) (10.1 g, 0.025 mol) obtained in Example 5-3, tetrahydrofuran (200 mL) and 10% palladium-activated carbon (2.2 g) were added, and in the same manner as in Example 1-4, a cis-trans mixture of the compound represented by the formula (17c) (9.51 g, 0.024 mol) was obtained. The yield was 94%.

Hexane (100 mL) was added thereto, and recrystallization was carried out to obtain a trans isomer of the compound represented by the formula (17c) (1.5 g, 0.0038 mol). Further, one having the filtrate concentrated was transferred to a 500 mL egg-plant form flask, and t-butoxy potassium (22.0 g, 0.22 mol) and N,N-dimethylformamide (300 mL) were added, followed by stirring and refluxing at 100° C. for 6 hours to convert the cis isomer of the compound represented by the formula (17c) to the trans isomer. After completion of the reaction, post treatment and recrystallization were carried out in the same manner as in Example 1-4 to obtain a trans isomer of the compound represented by the formula (17c) (6.84 g). The total amount of the compound (17c) being the trans isomer, was 8.34 g (0.021 mol), and the yield was 84%.

Example 5-5

Preparation Example for Compound (18c)

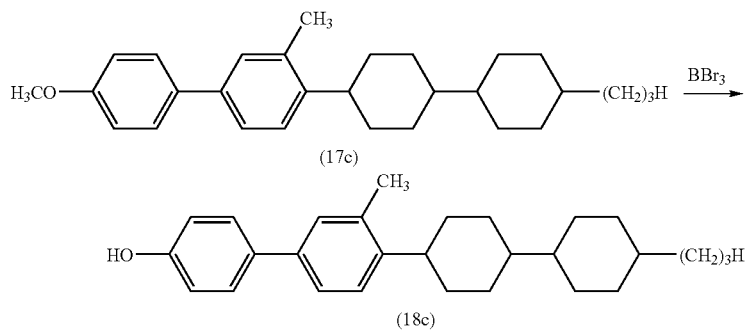

Into a 500 mL four-necked flask equipped with a reflux condenser, a stirrer and a dropping apparatus, the compound (17c) (8.10 g, 0.020 mol) obtained in Example 5-4 and dichloromethane (200 mL) were added. In a nitrogen stream, boron tribromide (25.1 g, 0.10 mol) was dropwise added over a period of 30 minutes. The dropwise adding operation was carried out under cooling with ice so that the internal temperature would not exceed 10° C. The reaction, post treatment and recrystallization were carried out in the same manner as in Example 1-5 to obtain 7.19 g of the compound (18c). The yield was 92%.

Example 5-6

Preparation Example for Compound (1A-5c)

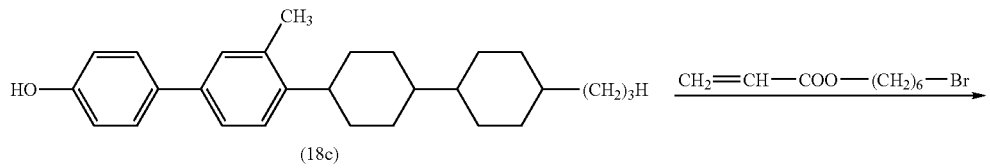

-continued

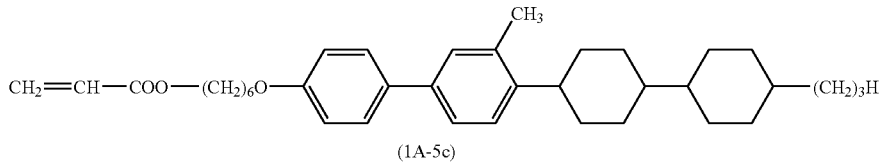

(1A-5c)

Into a 500 mL four-necked flask equipped with a reflux condenser, a stirrer and a dropping apparatus, the compound (18c) (7.00 g, 0.020 mol) obtained in Example 5-5, $CH_2=CH-COO-(CH_2)_6-Br$ (4.66 g, 0.018 mol), potassium carbonate (3.82 g, 0.036 mol), potassium iodide (0.50 g, 0.003 mol) and acetone (500 mL) were added, followed by stirring and refluxing at 60° C. for 24 hours. After completion of the reaction, post treatment and recrystallization were carried out in the same manner as in Example 1-1 to obtain 7.95 g of the compound (1A-5c). The yield was 73%.

The $^1$HNMR spectrum of the compound (1A-5c) is shown below.

$^1$HNMR (400 MHz, solvent: CDCl$_3$, internal standard: TMS) δ (ppm): 0.98 (t, 3H), 1.2-1.9 (m, 31H), 2.34 (s, 3H), 2.72 (m, 1H), 3.94 (t, 2H), 4.15 (t, 2H), 5.8-6.4 (m, 3H), 6.83 (dd, 2H), 7.1-7.3 (dd, 5H)

The phase transition temperature from the crystal phase to the nematic phase of the compound (1A-5c) was 96° C. Further, Δn of the compound (1A-5c) against a laser beam having a wavelength of 589 nm at 60° C. was 0.1513 (extrapolation value).

Preparation Example 6

Preparation Example for Compound (1B-1d)

Example 6-1

Preparation Example for Compound (23d)

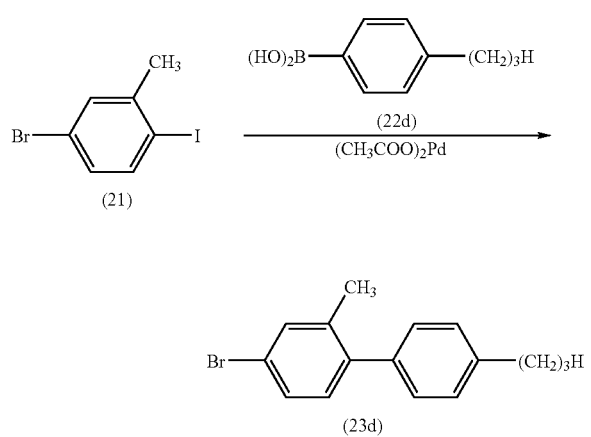

Into a 1,000 mL four-necked flask equipped with a reflux condenser, a stirrer and a dropping apparatus, the compound (21) (23.57 g, 0.079 mol), the compound (22d) (14.25 g, 0.087 mol), palladium acetate (0.90 g, 0.004 mol), and triphenylphosphine (2.07 g, 0.008 mol) were added. In a nitrogen stream, acetone (200 mL) and a 2 mol/L sodium hydrogen carbonate aqueous solution (250 mL) were added, followed by stirring and refluxing at 65° C. for 18 hours. After completion of the reaction, post treatment and column chromatography purification were carried out in the same manner as in Example 1-1 to obtain 16.0 g of the compound (23d). The yield was 70%.

Example 6-2

Preparation Example for Compound (25)

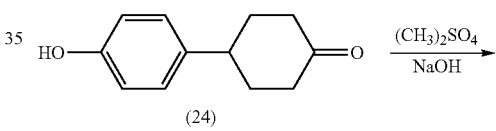

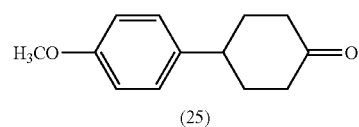

Into a 500 mL four-necked flask equipped with a reflux condenser, a stirrer and a dropping apparatus, the compound (24) (13.00 g, 0.068 mol) was added, and a 2 mol/L sodium hydroxide aqueous solution (250 mL) was added thereto. Dimethyl sulfate (34.48 g, 0.027 mol) was dropwise added thereto over a period of one hour in a nitrogen stream while paying attention so that the temperature in the reactor would not exceed 60° C. After completion of the dropwise addition, the temperature in the reactor was raised to 70° C. over a period of 30 minutes, followed by stirring and refluxing for 12 hours. After completion of the reaction, post treatment was carried out in the same manner as in Example 1-1 to obtain a powder crystal. To this powder crystal, a solvent mixture (200 mL) of dichloromethane and hexane was added, and recrystallization was carried out to obtain 11.8 g of a compound (25). The yield was 85%.

Example 6-3

Preparation Example for Compound (26d)

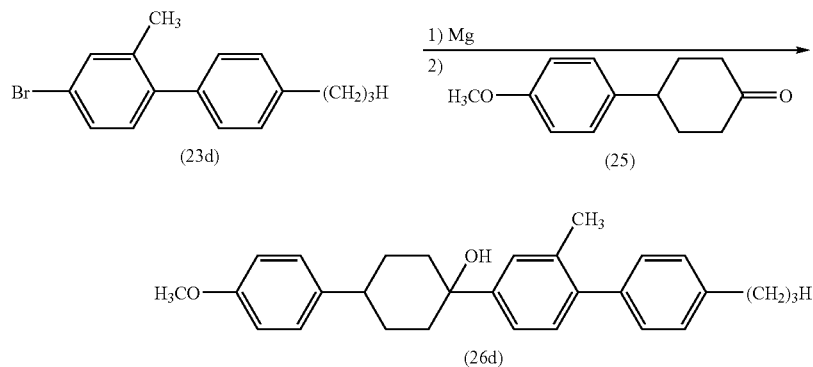

Into a 500 mL four-necked flask equipped with a reflux condenser, a stirrer and a dropping apparatus, magnesium (1.53 g, 0.063 mol) was added, and a solution having the compound (23d) (16.5 g, 0.057 mol) obtained in Example 6-1 dissolved in dehydrated tetrahydrofuran (50 mL) was dropwise added over a period of 30 minutes in a nitrogen stream. After completion of the dropwise addition, stirring and refluxing were carried out at 70° C. for 3 hours to prepare a Grignard reagent. Then, this four-necked flask was cooled to 0° C., and a solution having the compound (25) (11.7 g, 0.057 mol) dissolved in dehydrated tetrahydrofuran (100 mL) was dropwise added over a period of 30 minutes in a nitrogen stream. After completion of the dropwise addition, stirring and refluxing were carried out at 70° C. for 3 hours, and then a 1 mol/L ammonium chloride aqueous solution (100 mL) was added to stop the reaction.

A filtrate obtained by carrying out post treatment in the same manner as in Example 1-1, was subjected to purification by column chromatography (packed agent: silica gel 60N, manufactured by Kanto Chemical Co., Inc.) using ethyl acetate/hexane (volume ratio of 7:3) as a developer, to obtain 13.6 g of the compound (26d). The yield was 60%.

Example 6-4

Preparation Example for Compound (27d)

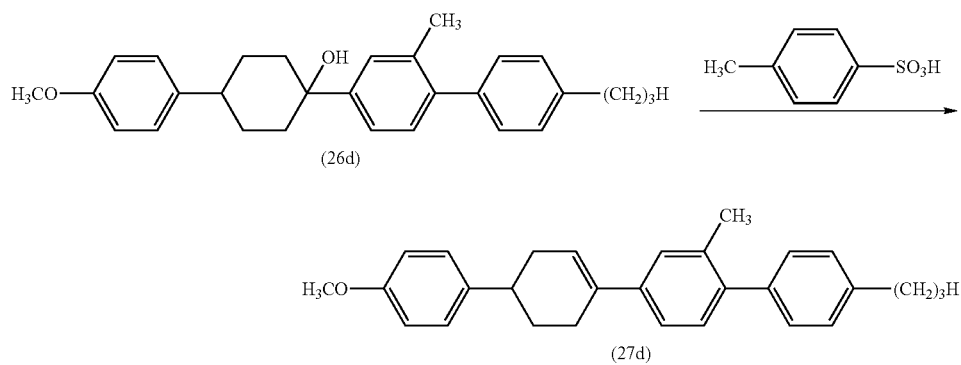

Into a 500 mL egg-plant form flask equipped with a reflux condenser and a stirrer, the compound (26d) (13.6 g, 0.034 mol) obtained in Example 6-3, p-toluene sulfonic acid monohydrate (0.32 g, 0.002 mol) and toluene (200 mL) were added. An isobaric dropping funnel containing a molecular sieve 4A (20 g) was attached thereto, and stirring and refluxing were carried out at 110° C. for 4 hours. After completion of the reaction, post treatment was carried out in the same manner as in Example 1-1 to obtain 12.8 g of the compound (27d). The yield was 95%.

Example 6-5

Preparation Example for Compound (28d)

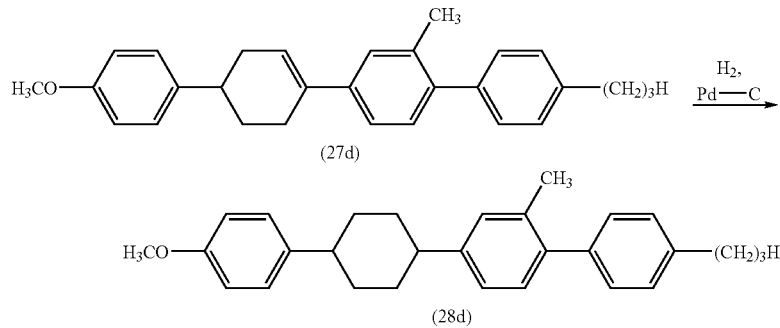

Into a 5,000 mL pressure-resistant reactor, the compound (27d) (12.80 g, 0.032 mol) obtained in Example 6-4, tetrahydrofuran (200 mL) and 10% palladium-activated carbon (2.5 g) were added, and in the same manner as in Example 1-4, a cis-trans mixture of the compound represented by the formula (28d) (12.1 g, 0.030 mol) was obtained. The yield was 95%.

Hexane (100 mL) was added thereto, and recrystallization was carried out to obtain a trans isomer of the compound represented by the formula (28d) (2.00 g, 0.005 mol). Further, one having the filtrate concentrated was transferred to a 500 mL egg-plant form flask, and t-butoxy potassium (28.0 g, 0.25 mol) and N,N-dimethylformamide (300 mL) were added, followed by stirring and refluxing at 100° C. for 6 hours to convert the cis isomer of the compound represented by the formula (28d) to the trans isomer. After completion of the reaction, water (500 mL) was added to stop the reaction, and post treatment was carried out in the same manner as in Example 1-1 to obtain a powder crystal. To this powder crystal, hexane (100 mL) was added, and recrystallization was carried out to obtain a trans isomer of the compound represented by the formula (28d) (1.88 g). The total amount of the compound (28d) being the trans isomer, was 3.88 g (0.0097 mol), and the yield was 30%.

Example 6-6

Preparation Example for Compound (29d)

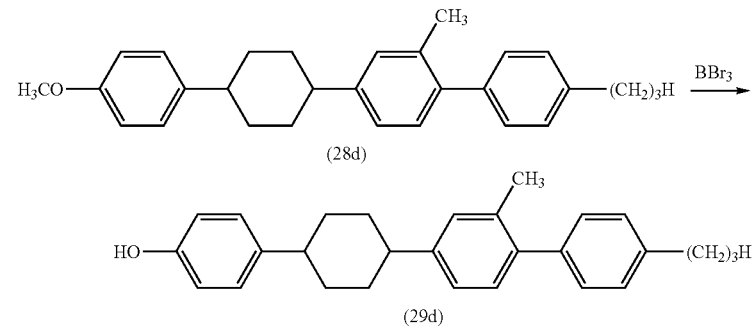

Into a 500 mL four-necked flask equipped with a reflux condenser, a stirrer and a dropping apparatus, the compound (28d) (3.70 g, 0.0093 mol) obtained in Example 6-5 and dichloromethane (200 mL) were added. In a nitrogen stream, boron tribromide (12.74 g, 0.047 mol) was dropwise added over a period of 30 minutes. The dropwise adding operation was carried out under cooling with ice so that the internal temperature would not exceed 10° C. Stirring was continued at room temperature for 3 hours, and then water was added to stop the reaction, and post treatment was carried out in the same manner as in Example 1-1. Then, the recrystallization was carried out by means of 100 mL of a solvent mixture of dichloromethane/hexane (volume ratio of dichloromethane/hexane:70/30) to obtain 3.40 g of the compound (29d). The yield was 95%.

Example 6-7

Preparation Example for Compound (1B-1d)

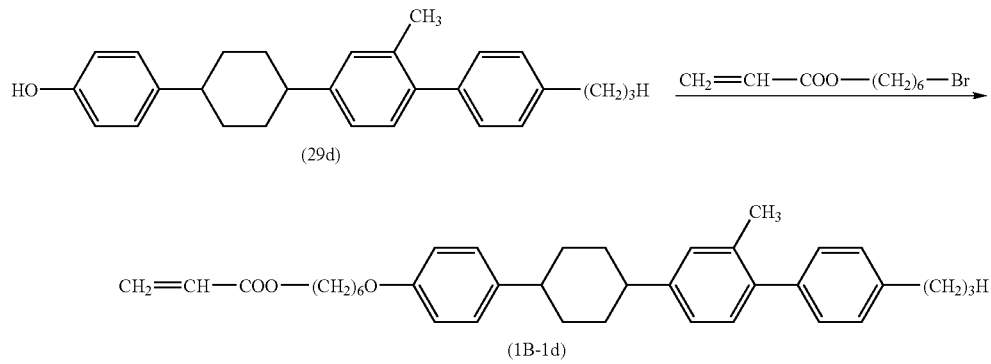

Into a 500 mL four-necked flask equipped with a reflux condenser, a stirrer and a dropping apparatus, the compound (29d) (3.30 g, 0.0086 mol) obtained in Example 6-6, CH$_2$=CH—COO—(CH$_2$)$_6$—Br (2.66 g, 0.0094 mol), potassium carbonate (2.13 g, 0.015 mol), potassium iodide (0.21 g, 0.0013 mol) and acetone (300 mL) were added, followed by stirring and refluxing at 60° C. for 24 hours. After completion of the reaction, post treatment and recrystallization were carried out in the same manner as in Example 1-1 to obtain 2.2 g of the compound (1B-1d). The yield was 48%.

The $^1$HNMR spectrum of the compound (1B-1d) is shown below.

$^1$HNMR (400 MHz, solvent: CDCl$_3$, internal standard: TMS) δ (ppm): 0.98 (t, 3H), 1.2-2.04 (m, 18H), 2.28 (s, 3H), 2.61-2.65 (m, 4H), 3.96 (t, 3H), 4.19 (t, 3H), 5.80-6.38 (m, 3H), 6.84-6.86 (dd, 2H), 6.99-7.00 (m, 4H), 7.18 (dd, 2H), 7.28-7.43 (m, 3H)

The phase transition temperature from the crystal phase to the nematic phase of the compound (1B-1d) was 100° C. Further, Δn of the compound (1B-1d) against a laser beam having a wavelength of 589 nm at 50° C. was 0.1588 (extrapolation value).

Preparation Example 7

Preparation Example for Compound (1B-2d)

Into a 500 mL four-necked flask equipped with a reflux condenser, a stirrer and a dropping apparatus, the compound (29d) (3.30 g, 0.0086 mol) obtained in Example 6-6, triethylamine (1.38 g, 0.013 mol) and dehydrated tetrahydrofuran (300 mL) were added. In a nitrogen stream, acrylic acid chloride (0.86 g, 0.0095 mol) was dropwise added under cooling with ice so that the inner temperature would not exceed 20° C., followed by stirring for 24 hours. After completion of the reaction, post treatment and recrystallization were carried out in the same manner as in Example 1-1 to obtain 3.14 g of the compound (1B-2d). The yield was 95%.

The $^1$HNMR spectrum of the compound (1B-2d) is shown below.

$^1$HNMR (400 MHz, solvent: CDCl$_3$, internal standard: TMS) δ (ppm): 0.99 (t, 3H), 1.53-2.07 (m, 10H), 2.29 (s, 3H), 2.65 (m, 4H), 5.99-6.62 (m, 3H), 7.10-7.23 (m, 4H), 7.23-7.46 (m, 7H)

The phase transition temperature from the crystal phase to the nematic phase of the compound (1B-2d) was 130° C. Further, Δn of the compound (1B-2d) against a laser beam having a wavelength of 589 nm at 90° C. was 0.1282 (extrapolation value).

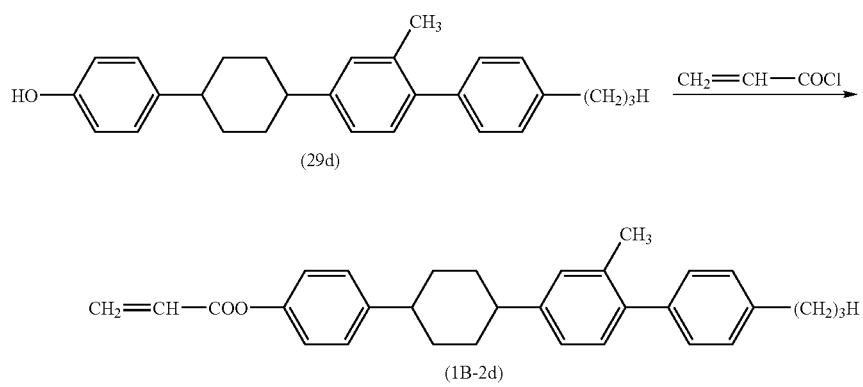

Preparation Example 8

Preparation of compound (1B-3e)

Example 8-1

Preparation Example for Compound (43e)

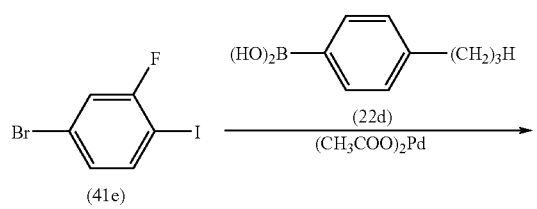

Into a 1,000 mL four-necked flask equipped with a reflux condenser, a stirrer and a dropping apparatus, the compound (41e) (23.77 g, 0.079 mol), the compound (22d) (14.25 g, 0.087 mol), palladium acetate (0.90 g, 0.004 mol) and triphenylphosphine (2.07 g, 0.008 mol) were added. In a nitrogen stream, acetone (200 mL) and a 2 mol/L sodium hydrogen carbonate aqueous solution (250 mL) were added thereto, followed by stirring and refluxing at 65° C. for 18 hours. After completion of the reaction, post treatment and column chromatography purification were carried out in the same manner as in Example 1-1 to obtain 15.3 g of the compound (43e). The yield was 66%.

Example 8-2

Preparation Example for Compound (1B-3e)

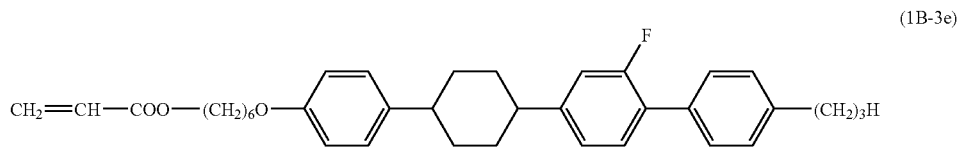

In Example 6-3, the compound (43e) (15.0 g, 0.051 mol) was used instead of the compound (23d), and in the same step as in Examples 6-3 to 6-7, 6.1 g of the compound (1B-3e) was obtained. The yield from the compound (43e) to the compound (1B-3e) was 22%.

The $^1$HNMR spectrum of the compound (1B-3e) is shown below.

$^1$HNMR (400 MHz, solvent: CDCl$_3$, internal standard: TMS) δ (ppm): 0.99 (t, 3H), 1.18-2.06 (m, 18H), 2.61-2.66 (m, 4H), 3.98 (t, 2H), 4.16 (t, 2H), 5.80-6.38 (m, 3H), 6.83-6.86 (dd, 2H), 6.97-7.02 (m, 4H), 7.21 (dd, 2H), 7.28-7.43 (m, 3H)

The phase transition temperature from the crystal phase to the nematic phase of the compound (1B-3e) was 58° C. Further, Δn of the compound (1B-3e) against a laser beam having a wavelength of 589 nm at 60° C. was 0.1176 (extrapolation value).

Preparation Example 9

Preparation Example for Compound (1B-4-f)

Example 9-1

Preparation Example for Compound (43f)

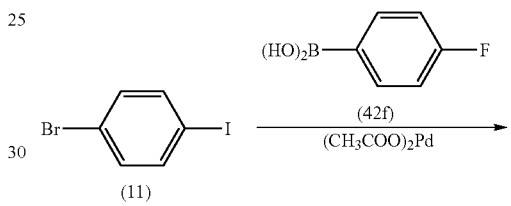

Into a 1,000 mL four-necked flask equipped with a reflux condenser, a stirrer and a dropping apparatus, the compound (11) (22.34 g, 0.079 mol), the compound (42f) (12.17 g, 0.087 mol), palladium acetate (0.90 g, 0.004 mol) and triphenylphosphine (2.07 g, 0.008 mol) were added. In a nitrogen stream, acetone (200 mL) and a 2 mol/L sodium hydrogen carbonate aqueous solution (250 mL) were added thereto, followed by stirring and refluxing at 65° C. for 18 hours. After completion of the reaction, post treatment and column chromatography purification were carried out in the same manner as in Example 1-1 to obtain 13.7 g of the compound (43f). The yield was 69%.

Example 9-2

Preparation Example for Compound (1B-4-f)

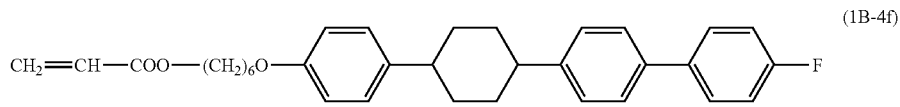

In Example 6-3, the compound (43f) (12.8 g, 0.051 mol) was used instead of the compound (23d), and in the same step as in Example 6-3 to Example 6-7, 1.5 g of the above compound (1B-4-f) was obtained. The yield from the compound (43f) to the compound (1B-4-f) was 5.7%.

The $^1$HNMR spectrum of the compound (1B-4-f) is shown below.

$^1$HNMR (400 MHz, solvent: CDCl$_3$, internal standard: TMS) δ (ppm): 1.28 (m, 4H), 1.57 (m, 2H), 1.71-1.74 (m, 10H), 2.72 (m, 2H), 3.94 (t, 2H), 4.15 (t, 2H), 5.8-6.4 (m, 3H), 6.64 (dd, 2H), 7.0-7.2 (dd, 6H), 7.4-7.5 (dd, 4H)

The phase transition temperature from the crystal phase to the nematic phase of the compound (1B-4-f) was 124° C. Further, Δn of the compound (1B-4-f) against a laser beam having a wavelength of 589 nm at 65° C. was 0.1612 (extrapolation value).

Preparation Example 10

Preparation Example for Compound (1B-5 g)

Example 10-1

Preparation Example for Compound (43 g)

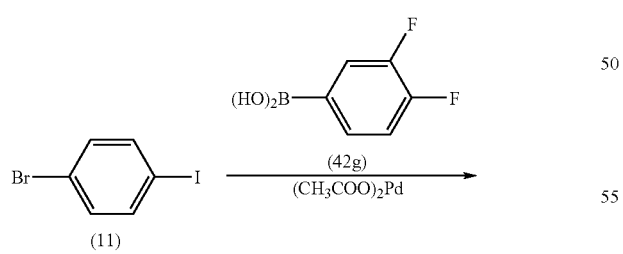

In Example 9-1, the compound (42 g) (13.78 g, 0.087 mol) was used instead of the compound (42f), and in the same step as in Example 9-1, 14.8 g (0.055 mol) of the above compound (43 g) was obtained. The yield was 63%.

Example 10-2

Preparation Example for Compound (1B-5 g)

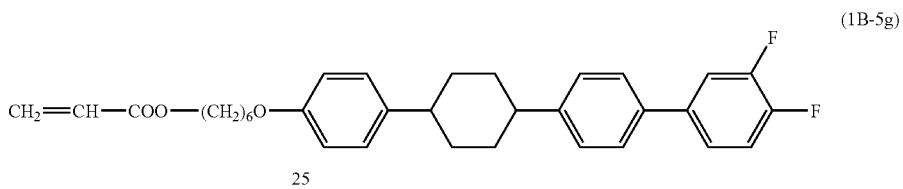

In Example 6-3, the compound (43 g) (13.5 g, 0.050 mol) was used instead of the compound (23d), and in the same step as in Example 6-3 to Example 6-7, 1.2 g of the above compound (1B-5 g) was obtained. The yield from the compound (43 g) to the compound (1B-5 g) was 4.5*.

The $^1$HNMR spectrum of the compound (1B-5 g) is shown below.

$^1$HNMR (400 MHz, solvent: CDCl$_3$, internal standard: TMS) δ (ppm): 1.29 (m, 4H), 1.59 (m, 2H), 1.69-1.74 (m, 10H), 2.73 (m, 2H), 3.95 (t, 2H), 4.14 (t, 2H), 5.8-6.4 (m, 3H), 6.66 (dd, 2H), 7.0-7.1 (t, 3H), 7.4-7.5 (t, 4H)

The phase transition temperature from the crystal phase to the nematic phase of the compound (1B-5 g) was 112° C. Further, Δn of the compound (1B-5 g) against a laser beam having a wavelength of 589 nm at 50° C. was 0.1665 (extrapolation value).

Preparation Example 11

Preparation Example for Compound (1B-6 h)

Example 11-1

Preparation Example for Compound (43 h)

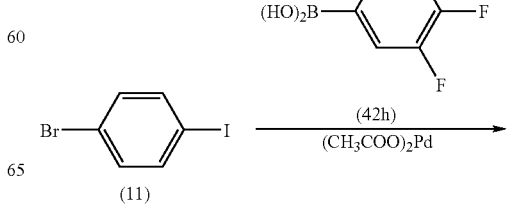

-continued

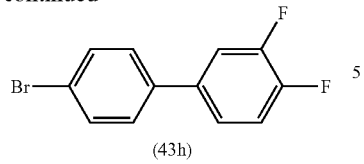
(43h)

In Example 9-1, the compound (42 h) (15.30 g, 0.087 mol) was used instead of the compound (42f), and in the same step as in Example 9-1, 14.1 g (0.049 mol) of the above compound (43 h) was obtained. The yield was 56%.

Example 11-2

Preparation Example for Compound (1B-6 h)

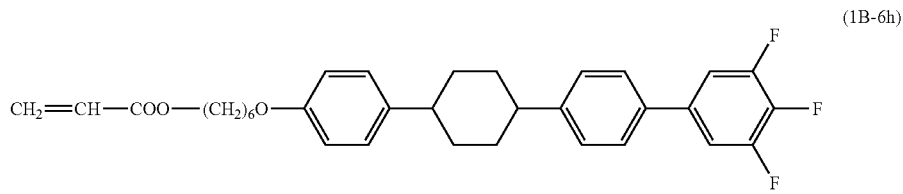
(1B-6h)

In Example 6-3, the compound (43 h) (12.9 g, 0.045 mol) was used instead of the compound (23d), and in the same step as in Example 6-3 to Example 6-7, 0.8 g of the above compound (1B-6 h) was obtained. The yield from the compound (43 h) to the compound (1B-6 h) was 3.3%.

The $^1$HNMR spectrum of the compound (1B-6 h) is shown below.

$^1$HNMR (400 MHz, solvent: CDCl$_3$, internal standard: TMS) δ (ppm): 1.27 (m, 4H), 1.55 (m, 2H), 1.70-1.76 (m, 10H), 2.7 (m, 2H), 3.96 (t, 2H), 4.20 (t, 2H), 5.8-6.4 (m, 3H), 6.68 (dd, 2H), 6.9-7.2 (t, 4H), 7.4-7.5 (dd, 2H)

The phase transition temperature from the crystal phase to the nematic phase of the compound (1B-6 h) was 98° C. Further, Δn of the compound (1B-6 h) against a laser beam having a wavelength of 589 nm at 65° C. was 0.1505 (extrapolation value).

Preparation Example 12

Preparation Example for Compound (1C-1 g)

Example 12-1

Preparation Example for Compound (33 g)

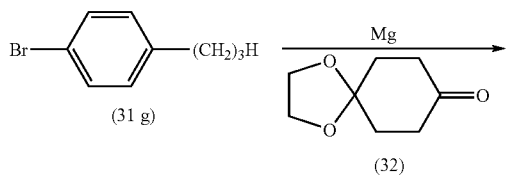
(31 g)

(32)

-continued

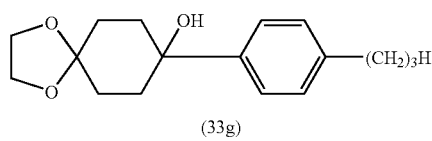
(33g)

Into a 1 L four-necked flask equipped with a dropping apparatus and a reflux condenser and flushed with nitrogen, magnesium (6.45 g, 0.27 mol) was added, and a solution having the compound (31 g) (16.5 g, 0.25 mol) dissolved in dehydrated tetrahydrofuran (50 mL) was dropwise added over a period of 30 minutes in a nitrogen stream. After completion of the dropwise addition, stirring and refluxing were carried out at 70° C. for 3 hours to prepare a Grignard reagent. Then, this four-necked flask was cooled to 0° C., and a solution having the compound (32) (35.1 g, 0.23 mol) dissolved in dehydrated tetrahydrofuran (100 mL) was dropwise added over a period of 30 minutes in a nitrogen stream. After completion of the dropwise addition, stirring was carried out at room temperature for 2 hours. After completion of the reaction, a 1 mol/L ammonium chloride aqueous solution (400 mL) was added to stop the reaction. Then, post treatment and column chromatography purification were carried out in the same manner as in Example 1-1 to obtain 42.4 g of the compound (33 g). The yield was 68%.

Example 12-2

Preparation Example for Compound (34 g)

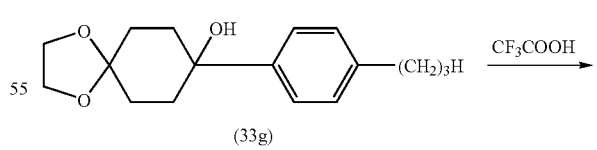
(33g)

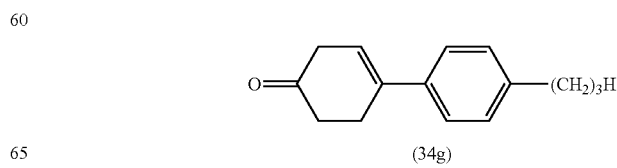
(34g)

Into a 500 mL four-necked flask, the compound (33 g) (40 g, 0.15 mol) obtained in Example 12-1 and trifluoroacetic acid (50 mL) were added, followed by stirring at room temperature for one hour. After completion of the reaction, the reaction solution was poured into a saturated sodium hydrogen carbonate aqueous solution. A filtrate obtained by carrying out post treatment in the same manner as in Example 1-1, was subjected to purification by column chromatography (packed agent: silica gel 60N, manufactured by Kanto Chemical Co., Inc.) using hexane/ethyl acetate (volume ratio of 7/3) as a developer to obtain 26.3 g of the compound (34 g). The yield was 84%.

Example 12-3

Preparation Example for Compound (35 g)

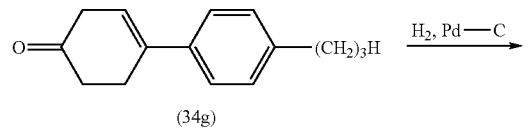

Into a 500 mL pressure-resistant container, the compound (34 g) (25 g, 0.12 mol) obtained in Example 12-2, tetrahydrofuran (300 mL) and 10% palladium-activated carbon (3.0 g) were added, and the reaction was carried out in the same manner as in Example 1-4. However, the reaction time was 8 hours. After completion of the reaction, the reaction solution was subjected to celite filtration to remove the catalyst, and concentration was carried out by a rotary evaporator. The obtained filtrate was subjected to purification by column chromatography (packed agent: silica gel 60N, manufactured by Kanto Chemical Co., Inc.) using hexane/ethyl acetate (volume ratio of 7/3) as a developer to obtain 22.7 g of the compound (35 g). The yield was 90%.

Example 12-4

Preparation Example for Compound (13)

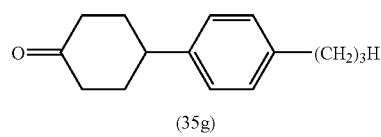

In the same manner as Example 1-1, the compound (13) was prepared from the compound (11) and the compound (12).

Example 12-5

Preparation Example for Compound (36 g)

Into a 500 mL four-necked flask equipped with a reflux condenser, a stirrer and a dropping apparatus, magnesium (2.6 g, 0.11 mol) was added, and a solution having the compound (13) (26.8 g, 0.097 mol) obtained in Example 12-4 dissolved in dehydrated tetrahydrofuran (50 mL) was dropwise added over a period of 30 minutes in a nitrogen stream. After completion of the dropwise addition, stirring and refluxing were carried out at 70° C. for 3 hours to prepare a Grignard reagent. Then, this four-necked flask was cooled to 0° C., and a solution having the compound (35 g) (20.9 g, 0.097 mol) obtained in Example 12-3 dissolved in dehydrated tetrahydrofuran (100 mL) was dropwise added over a period of 30 minutes in a nitrogen stream. After completion of the dropwise addition, stirring and refluxing were carried out at 70° C. for 3 hours. Then, in the same manner as in Example 1-2, 28.0 g of the compound (36 g) was obtained. The yield was 70%.

Example 12-6

Preparation Example for Compound (37 g)

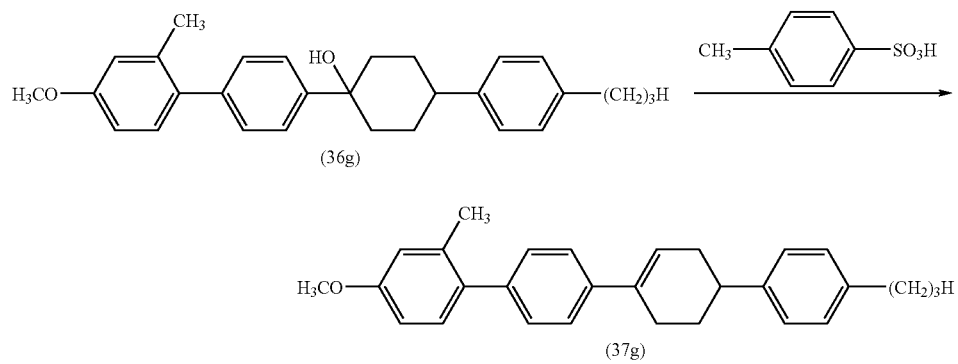

Into a 500 mL egg-plant form flask equipped with a reflux condenser and a stirrer, the compound (36 g) (27.8 g, 0.067 mol) obtained in Example 12-5, p-toluene sulfonic acid monohydrate (0.64 g, 0.004 mol) and toluene (200 mL) were added. An isobaric dropping funnel containing a molecular sieve 4A (20 g) was attached thereto, and stirring and refluxing were carried out at 110° C. for 4 hours. After completion of the reaction, post treatment was carried out in the same manner as in Example 1-1 to obtain 25.8 g of the compound (37 g). The yield was 97%.

Example 12-7

Preparation Example for Compound (38 g)

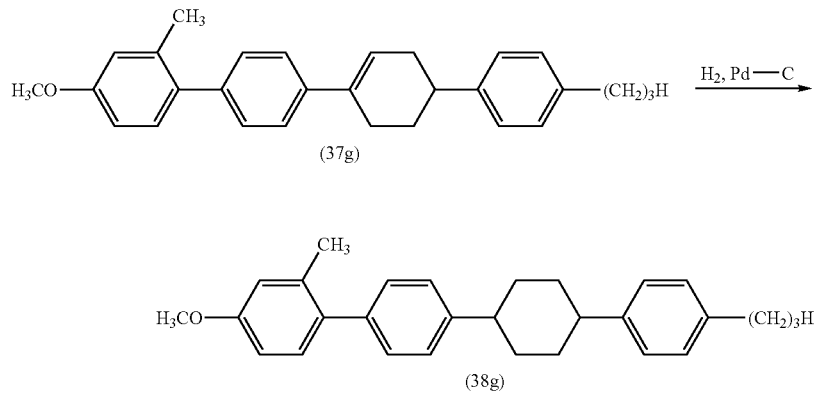

Into a 5,000 mL pressure-resistant reactor, the compound (37 g) (25.5 g, 0.064 mol) obtained in Example 12-6, tetrahydrofuran (200 mL) and 10% palladium-activated carbon (5.1 g) were added, and in the same is manner as in Example 1-4, a cis-trans mixture of the compound represented by the formula (38 g) (24.6 g, 0.062 mol) was obtained. The yield was 96%.

Hexane (100 mL) was added thereto, and recrystallization was carried out to obtain a trans isomer of the compound represented by the formula (38 g) (4.43 g, 0.011 mol). Further, one having the filtrate concentrated was transferred to a 500 mL egg-plant form flask, and t-butoxy potassium (56.7 g, 0.51 mol) and N,N-dimethylformamide (300 mL) were added, followed by stirring and refluxing at 100° C. for 6 hours to convert the cis isomer of the compound represented by the formula (38 g) to the trans isomer. After completion of the reaction, water (800 mL) was added to stop the reaction, and in the same manner as in Example 1-4, the trans isomer of the compound represented by the formula (38 g) (15.25 g) was obtained. The total amount of the compound (38 g) being the trans isomer was 19.68 g (0.045 mol), and the yield was 77%.

Example 12-8

Preparation Example for Compound (39 g)

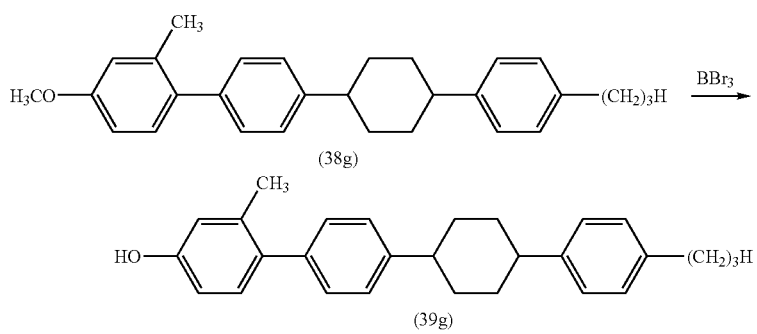

Into a 500 mL four-necked flask equipped with a reflux condenser, a stirrer and a dropping apparatus, the compound (38 g) (19.3 g, 0.048 mol) obtained in Example 12-7 and dichloromethane (200 mL) were added. In a nitrogen stream, boron tribromide (60.7 g, 0.24 mol) was dropwise added over a period of 30 minutes. The dropwise adding operation was carried out under cooling with ice so that the inner temperature would not exceed 10° C. Stirring was continued at room temperature for 3 hours, and then, water was added to stop the reaction, and post treatment was carried out in the same manner as in Example 1-1. Then, recrystallization was carried out by using 300 mL of a solvent mixture of dichloromethane and hexane (volume ratio of dichloromethane/hexane:70/30) to obtain 17.69 g of the compound (39 g). The yield was 95%.

Example 12-9

Preparation Example for Compound (1C-1 g)

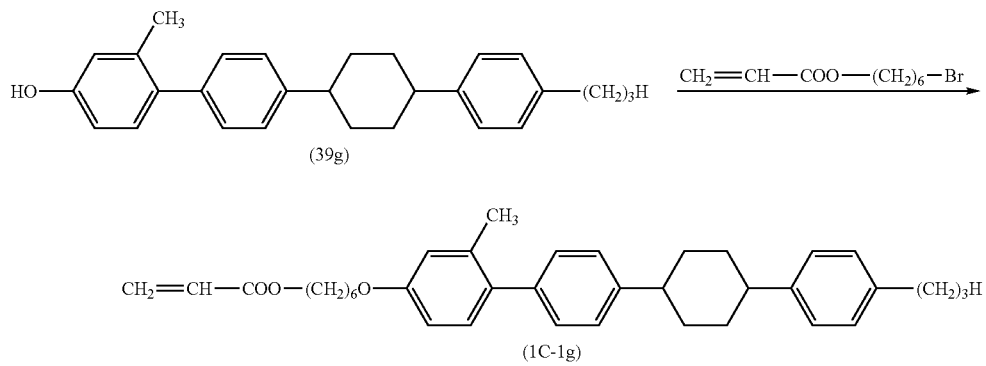

Into a 500 mL four-necked flask equipped with a reflux condenser, a stirrer and a dropping apparatus, the compound (39 g) (17.5 g, 0.046 mol) obtained in Example 12-8, $CH_2$=CH—COO—$(CH_2)_6$—Br (11.77 g, 0.050 mol), potassium carbonate (11.32 g, 0.082 mol), potassium iodide (1.13 g, 0.007 mol) and acetone (500 mL) were added, followed by stirring and refluxing at 60° C. for 24 hours. After completion of the reaction, post treatment and recrystallization were carried out in the same manner as in Example 1-1 to obtain 18.87 g of the compound (1C-1g). The yield was 77%.

The $^1$HNMR spectrum of the compound (1C-1g) is shown below.

$^1$HNMR (400 MHz, solvent: $CDCl_3$, internal standard: TMS) δ (ppm): 0.96 (t, 3H), 1.29 (m, 4H), 1.6-1.9 (m, 14H), 2.35 (s, 3H), 2.55 (t, 2H), 2.72 (m, 2H), 3.94 (t, 2H), 4.15 (t, 2H), 5.8-6.4 (m, 3H), 6.63 (dd, 2H), 7.02-7.04 (dd, 4H), 7.19 (dd, 2H), 7.3-7.4 (dd, 3H)

The phase transition temperature from the crystal phase to the nematic phase of the compound (1C-1g) was 90° C. Further, Δn of the compound (1C-1g) against a laser beam having a wavelength of 589 nm at 80° C. was 0.1733 (extrapolation value).

Now, Examples for liquid crystal compositions of the present invention using the compounds (1) prepared in the above Preparation Examples 1 to 12 will be described in detail, but it should be understood that the present invention is by no means thereby restricted. In the following Examples, as a photopolymerization initiator, IRGACURE 907 manufactured by Ciba Specialty Chemicals K.K. was used.

Examples 1 to 8

Preparation of Liquid Crystal Compositions

Polymerizable liquid crystals were mixed in proportions as identified in Table 1 to obtain liquid crystal compositions A to H. Here, the proportion shown in Table 1 is a proportion (mol %) of each polymerizable liquid crystal based on all polymerizable liquid crystals constituting the liquid crystal composition. Further, as another polymerizable liquid crystal, the following compound (3-1-1a) was used.

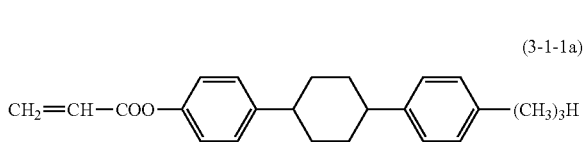

(3-1-1a)

Then, to the liquid crystal compositions A to H, the polymerization initiator was added (0.5 mass % based on the liquid crystal compositions) to obtain liquid crystal compositions A1 to H1.

Table 1 shows Tm and Tc of the liquid crystal compositions A to H as well as the values of Δn of the liquid crystal compositions A1 to H1.

TABLE 1

|  | Ex. 1 | Ex. 2 | Ex. 3 | Ex. 4 |
| --- | --- | --- | --- | --- |
|  | Liquid crystal composition A | Liquid crystal composition B | Liquid crystal composition C | Liquid crystal composition D |
| Compound (1A-1a) | 50 | — | — | — |
| Compound (1A-3b) | — | 50 | — | — |
| Compound (1A-5c) | — | — | 50 | — |
| Compound (1B-1d) | — | — | — | 50 |
| Compound (3-1-1a) | 50 | 50 | 50 | 50 |
| Tm | 80° C. | 69° C. | 71° C. | 69° C. |
| Tc | 125° C. or higher | 125° C. or higher | 125° C. or higher | 125° C. or higher |
|  | Liquid crystal composition A1 | Liquid crystal composition B1 | Liquid crystal composition C1 | Liquid crystal composition D1 |
| Δn @ 589 nm | 0.1508 (60° C.) | 0.1312 (60° C.) | 0.1430 (60° C.) | 0.1475 (50° C.) |
|  | Ex. 5 | Ex. 6 | Ex. 7 | Ex. 8 |
|  | Liquid crystal composition E | Liquid crystal composition F | Liquid crystal composition G | Liquid crystal composition H |
| Compound (1C-1g) | 50 | — | — | — |
| Compound (1A-1a) | — | 70 | — | — |
| Compound (1A-2a) | — | 30 | — | — |
| Compound (1A-4b) | — | — | 50 | — |
| Compound (1B-1d) | — | — | — | 70 |
| Compound (1B-2d) | — | — | — | 30 |
| Compound (3-1-1a) | 50 | — | 50 | — |
| Tm | 75° C. | 81° C. | 80° C. | 72° C. |
| Tc | 125° C. or higher | 125° C. or higher | 125° C. or higher | 125° C. or higher |
|  | Liquid crystal composition E1 | Liquid crystal composition F1 | Liquid crystal composition G1 | Liquid crystal composition H1 |
| Δn @ 589 nm | 0.1650 (50° C.) | 0.1356 (90° C.) | 0.1508 (60° C.) | 0.1383 (90° C.) |

Preparation and Evaluation of Optical Elements

Example 9

Preparation Example for Optical Element A

To a glass substrate of 5 cm×5 cm×0.5 mm in thickness, a polyimide solution was applied by spin-coating and dried, followed by rubbing treatment in a predetermined direction with a nylon cloth to prepare a support. Two such supports were bonded to each other by use of an adhesive agent so that the surfaces which were treated for alignment faced each other, whereby a cell was prepared. Glass beads having a diameter of 4 μm were added to the adhesive agent so that the space between the supports was adjusted to 4 μm.

Then, the liquid crystal composition A1 prepared in Example 1 was injected into the cell at 105° C. Photopolymerization was conducted under irradiation with ultraviolet light with an intensity of 80 mW/cm² at 50° C. so that the total amount of light was 5,300 mJ/cm² to obtain an optical element A. The optical element A was horizontally aligned in the rubbing direction of the substrate. The optical element A was transparent in the visible light range, and no scattering was observed. Further, Δn against a laser beam having a wavelength of 589 nm was 0.1018.

Evaluation of Optical Element A

The optical element A obtained in Example 9 was irradiated with a Kr laser (multimode at wavelengths of 407 nm and 413 nm) to carry out an accelerated exposure test with blue laser beam. The irradiation conditions were such that the temperature was 60° C. and the total exposure energy was 15 W·h/mm². The decrease in Δn after the test relative to Δn before the accelerated exposure test was less than 1%. Further, after the exposure test, the aberration at the exposed portion was measured, and the difference between the maximum value and the minimum value in the aberration at the portion was less than 10 mλ (wherein λ corresponds to the wavelength of 405 nm of the measurement light). From the foregoing, the optical element A was confirmed to be excellent in durability against a blue laser beam.

Examples 10 to 16

In the same manner as in Example 9, optical elements B to H were prepared and evaluated in the same manner.

The preparation conditions, evaluation conditions and evaluation results are shown in Table 2.

TABLE 2

| | Ex. 9 Optical element A | Ex. 10 Optical element B | Ex. 11 Optical element C | Ex. 12 Optical element D |
|---|---|---|---|---|
| Liquid crystal composition | A1 | B1 | C1 | D1 |
| Cell gap (μm) | 4 | 4 | 4 | 4 |
| Preparation conditions for optical element | | | | |
| Injection temperature (° C.) | 105 | 105 | 105 | 105 |
| polymerization temperature (° C.) | 50 | 60 | 50 | 50 |
| UV intensity (mW/cm²) | 80 | 80 | 80 | 80 |
| Total amount of light (mJ/cm²) | 5300 | 5300 | 5300 | 5300 |
| Evaluation of optical element | | | | |
| Transparency | Transparent | Transparent | Transparent | Transparent |
| Scattering | ND | ND | ND | ND |
| Alignment of liquid crystal | Horizontal alignment | Horizontal alignment | Horizontal alignment | Horizontal alignment |
| Δn @ 589 nm | 0.1018 | 0.1066 | 0.1161 | 0.1349 |
| Accelerated exposure test conditions | | | | |
| Temperature (° C.) | 60 | 60 | 60 | 60 |
| Total exposure energy (W·h/mm²) | 15 | 15 | 15 | 15 |
| Accelerated exposure test results | | | | |
| Decrease in Δn | Less than 1% | Less than 1% | Less than 1% | Less than 1% |
| Aberration (mλ) | Less than 10 | Less than 10 | Less than 10 | Less than 10 |
| | Ex. 13 Optical element E | Ex. 14 Optical element F | Ex. 15 Optical element G | Ex. 16 Optical element H |
| Liquid crystal composition | E1 | F1 | G1 | H1 |
| Cell gap (μm) | 4 | 4 | 4 | 4 |
| Preparation conditions for optical element | | | | |
| Injection temperature (° C.) | 105 | 105 | 105 | 105 |

TABLE 2-continued

| | | | | |
|---|---|---|---|---|
| polymerization temperature (° C.) | 60 | 100 | 60 | 90 |
| UV intensity (mW/cm$^2$) | 80 | 80 | 80 | 80 |
| Total amount of light (mJ/cm$^2$) | 5300 | 5300 | 5300 | 5300 |
| Evaluation of optical element | | | | |
| Transparency | Transparent | Transparent | Transparent | Transparent |
| Scattering | ND | ND | ND | ND |
| Alignment of liquid crystal | Horizontal alignment | Horizontal alignment | Horizontal alignment | Horizontal alignment |
| Δn @ 589 nm | 0.0964 | 0.1097 | 0.0651 | 0.1383 |
| Accelerated exposure test conditions | | | | |
| Temperature (° C.) | 60 | 60 | 60 | 60 |
| Total exposure energy (W · h/mm$^2$) | 15 | 15 | 15 | 15 |
| Accelerated exposure test results | | | | |
| Decrease in Δn | Less than 1% | Less than 1% | Less than 1% | Less than 1% |
| Aberration (mλ) | Less than 10 | Less than 10 | Less than 10 | Less than 10 |

Comparative Example 1

Preparation Example for Liquid Crystal Compositions

The following compound (4a), the following compound (4b), the following compound (4c) and the following compound (4d) were mixed in a molar ratio of 1:1:1:1 to prepare a liquid crystal composition J. Then, to the liquid crystal composition J, the photopolymerization initiator was added in an amount of 0.5 mass % based on the liquid crystal composition J to obtain a liquid crystal composition J1.

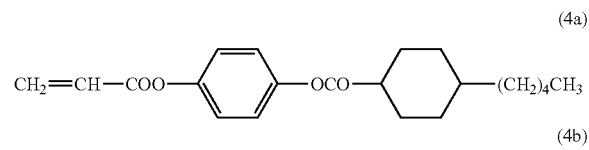

(4a)

(4b)

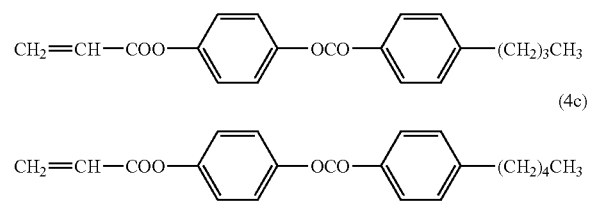

(4c)

(4d)

Preparation and Evaluation of Optical Element

An optical element J was obtained in the same manner as in Example 9 except that the liquid crystal composition A1 was changed to the liquid crystal composition J1 obtained by the above process. Δn against a laser beam having a wavelength of 589 nm was 0.046. Further, the optical element J was transparent in the visible light range, and no scattering was observed.

The optical element J was subjected to an accelerated exposure test with blue laser beam in the same manner as in Example 9. The decrease in Δn after the test relative to Δn before the accelerated exposure test was 30%. Further, the transmittance of a laser beam having a wavelength of 405 nm after the test was found to have decreased to 60% of the transmittance before the test. Further, the aberration at the exposed portion was measured after the accelerated test, whereby the difference between the maximum value and the minimum value in the aberration at the portion was at least 600 mλ (where λ corresponds to the wavelength of 405 nm of the measurement light).

Comparative Example 2

Preparation Example for Liquid Crystal Composition

The following compound (5a) and the following compound (5b) were mixed in a molar ratio of 1:1 to prepare a liquid crystal composition K. Then, to the liquid crystal composition K, the photopolymerization initiator was added in an amount of 0.5 mass % based on the liquid crystal composition K to obtain a liquid crystal composition K1.

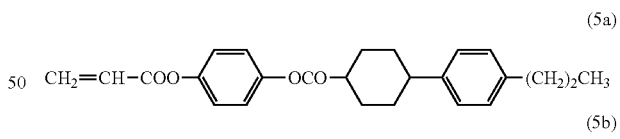

(5a)

(5b)

Preparation and Evaluation of Optical Element

An optical element K was obtained in the same manner as in Example 9 except that the liquid crystal composition A1 was changed to the liquid crystal composition K1 obtained by the above process. Δn against a laser beam having a wavelength of 589 nm was 0.056. Further, the optical element K was transparent in the visible light range, and no scattering was observed.

The optical element K was subjected to an accelerated exposure test with blue laser beam in the same manner as in Example 9. The decrease in Δn after the test relative to Δn before the accelerated exposure test was less than 1%. Further, the aberration at the exposed portion was measured after the accelerated test, whereby the difference between the maximum value and the minimum value in the aberration at the portion was 25 mλ (where λ corresponds to the wavelength of 405 nm of the measurement light).

INDUSTRIAL APPLICABILITY

The novel compound of the present invention and the optical anisotropic material obtained by polymerizing a liquid crystal composition containing such a novel compound well satisfy the properties required for general optical anisotropic materials, and they are excellent also in the durability against a blue laser beam. Accordingly, an optical element prepared by using such a novel compound of the present invention is useful not only for an optical element to be used for conventional optical pickup elements, imaging elements and communication devices, but also effectively useful as a material for e.g. a diffraction element and phase plate to modulate a blue laser beam.

The entire disclosure of Japanese Patent Application No. 2005-301138 filed on Oct. 17, 2005 including specification, claims and summary is incorporated herein by reference in its entirety.

What is claimed is:

1. A compound represented by the following formula (1):

$$CH_2=CR^1-COO-(L)_k-E^1-E^2-E^3-E^4-R^2 \quad (1)$$

provided that the symbols in the formula have the following meanings:
$R^1$: a hydrogen atom or a methyl group;
$R^2$: a $C_{1-8}$ alkyl group or a fluorine atom;
k: 0 or 1;
L: $-(CH_2)_pO-$ or $-(CH_2)_q-$ (wherein each of p and q which are independent of each other, is an integer of from 2 to 8);
$E^1$: a 1,4-phenylene group;
$E^2$, $E^3$, $E^4$: each independently a 1,4-phenylene group or a trans-1,4-cyclohexylene group and at least one of $E^2$ and $E^3$ is a trans-1,4-cyclohexylene group,
provided that the 1,4-phenylene group and trans-1,4-cyclohexylene group in $E^1$ to $E^4$, may be such that a hydrogen atom bonded to a carbon atom in each group may be substituted by a fluorine atom, a chlorine atom or a methyl group.

2. The compound according to claim 1, wherein when a 1,4-phenylene group is represented by -Ph- and a trans-1,4-cyclohexylene group is represented by -Cy-, $-E^1-E^2-E^3-E^4-$ is -Ph-Cy-Ph-Ph-, -Ph-Ph-Cy-Cy- or -Ph-Ph-Cy-Ph-.

3. The compound according to claim 1, wherein k is 1.

4. A liquid crystal composition containing at least 75 mass % of a polymerizable liquid crystal containing the compound as defined in claim 1.

5. The liquid crystal composition according to claim 4, wherein the polymerizable liquid crystal comprises from 30 to 95 mass % of at least one compound of formula (1), and from 5 to 70 mass % of at least one compound selected from the compounds of the following formulae (3-1) and (3-2):

$$CH_2=CR^3-COO-(M)_m-E^5-E^6-E^7-R^4 \quad (3-1)$$

$$CH_2=CR^5-COO-(N)_n-E^8-E^9-R^6 \quad (3-2)$$

provided that the symbols in the formulae have the following meanings:
$R^3$, $R^5$: each independently a hydrogen atom or a methyl group;
$R^4$, $R^6$: each independently a $C_{1-8}$ alkyl group;
m, n: each independently 0 or 1;
M, N: each independently $-(CH_2)_sO-$ or $-(CH_2)_t-$ (provided that each of s and t which are independent of each other is an integer of from 2 to 8);
$E^5$, $E^6$, $E^7$, $E^8$, $E^9$: each independently a 1,4-phenylene group or a trans-1,4-cyclohexylene group, provided that at least one of $E^5$, $E^6$ and $E^7$ is a trans-1,4-cyclohexylene group,
provided that the above 1,4-phenylene group and trans-1,4-cyclohexylene group may be such that a hydrogen atom bonded to a carbon atom in each group may be substituted by a fluorine atom, a chlorine atom or a methyl group.

6. An optical anisotropic material made of a polymer obtained by polymerizing the liquid crystal composition as defined in claim 4 in a state where the liquid crystal composition shows a liquid crystal phase and in a state where the liquid crystal is aligned.

7. The optical anisotropic material according to claim 6, which has a laser beam having a wavelength of from 300 to 450 nm impinging thereon.

8. An optical element having a structure such that the optical anisotropic material as defined in claim 6 is sandwiched between a pair of supports.

9. A diffraction element, which comprises the optical element as defined in claim 8.

10. A phase plate, which comprises the optical element as defined in claim 8.

11. The compound according to claim 1, which is one of the following compounds:

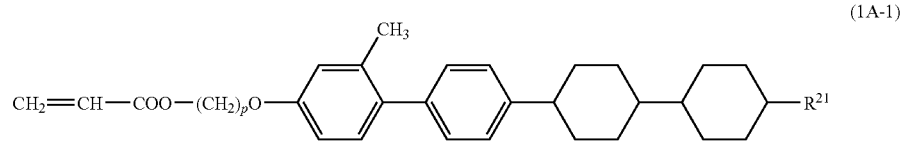

(1A-1)

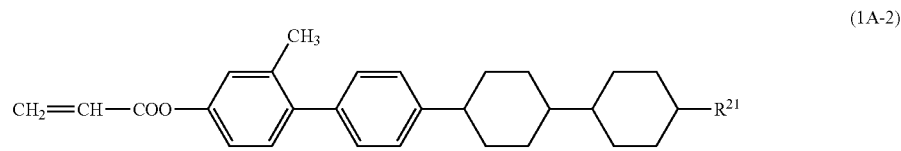

(1A-2)

-continued
(1A-3)
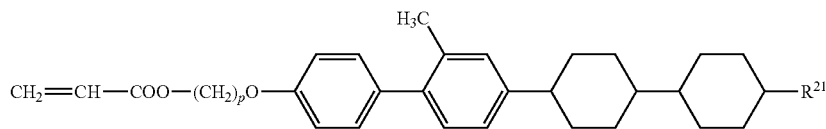
(1A-4)
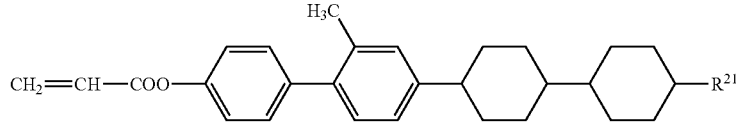
(1A-5)
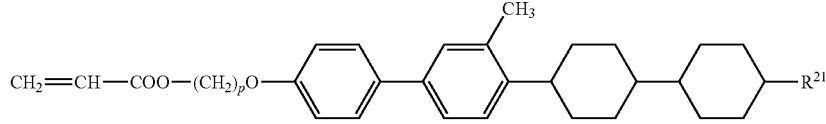
(1B-1)
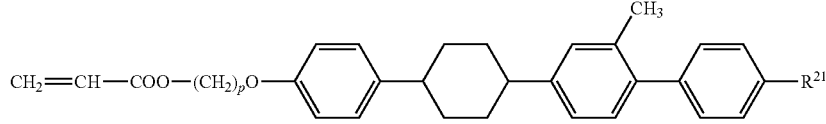
(1B-2)
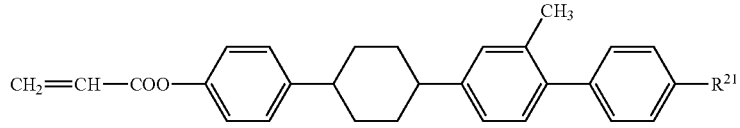
(1B-3)
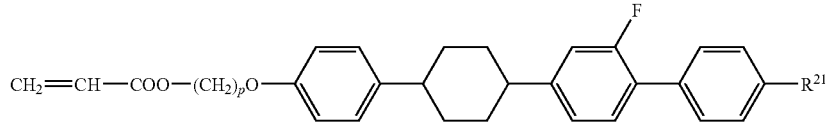
(1B-4)
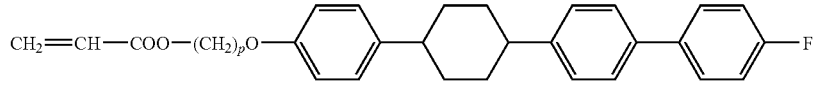
(1B-5)
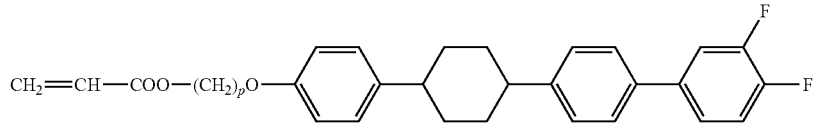
(1B-6)
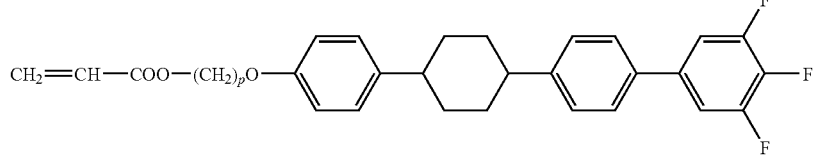
(1C-1)
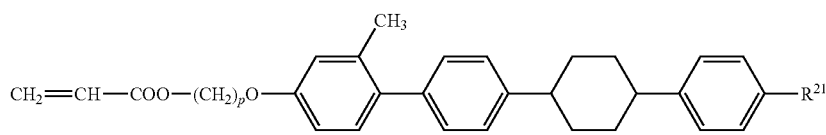
(1C-2)
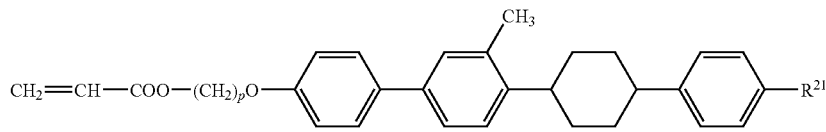

where $R^{21}$ is a C1-8 alkyl group.

12. The compound according to claim 11, wherein $R^{21}$ is a $C_{2-6}$ linear alkyl group.

13. The compound according to claim 11, wherein p is an integer of from 4 to 6.

14. The compound according to claim 11, which is one of the following compounds:
(1A-1),
(1A-3), and
(1A-5).

15. The compound according to claim 11, which is one of the following compounds:
(1B-1),
(1B-3)
(1B-4), and
(1B-5).

16. The compound according to claim 11, which is one of the following compounds:
(1C-1) and
(1C-2).

17. The liquid crystal composition according to claim 5, wherein the polymerizable liquid crystal comprises from 5 to 70 mass % of at least one compound selected from the compounds of the following formulae:

$$CH_2{=}CR^3{-}COO\text{-Ph-Cy-Ph-}R^4 \qquad (3\text{-}1\text{-}1)$$

$$CH_2{=}CR^3{-}COO\text{-Ph-Ph-Cy-}R^4 \qquad (3\text{-}1\text{-}2)$$

$$CH_2{=}CR^5{-}COO\text{-Cy-Cy-}R^6 \qquad (3\text{-}2\text{-}1)$$

wherein -Ph- is a 1,4-phenylene group and -Cy- is a trans-1,4-cyclohexylene group.

* * * * *